United States Patent [19]
Weder et al.

[11] Patent Number: 5,664,403
[45] Date of Patent: *Sep. 9, 1997

[54] METHOD FOR CRIMPING A SLEEVE ABOUT A FLORAL GROUPING

[75] Inventors: Donald E. Weder, Highland; William F. Straeter, Breese, both of Ill.

[73] Assignee: Southpac Trust International, Inc.; not individually, but as trustee of The Family Trust U/T/A dated December 8, 1995, Charles A. Codding, Authorized Signatory for Southpac Trust International, Inc. trustee

[*] Notice: The term of this patent shall not extend beyond the expiration date of Pat. No. 5,373,942.

[21] Appl. No.: 333,105

[22] Filed: Nov. 1, 1994

Related U.S. Application Data

[63] Continuation of Ser. No. 95,331, Jul. 21, 1993, Pat. No. 5,428,939, and a continuation-in-part of Ser. No. 165,215, Dec. 10, 1993, Pat. No. 5,373,943, said Ser. No. 95,331, is a continuation-in-part of Ser. No. 963,882, Oct. 20, 1992, Pat. No. 5,408,803, which is a continuation-in-part of Ser. No. 649,379, Jan. 31, 1991, Pat. No. 5,111,638, which is a continuation of Ser. No. 249,761, Sep. 26, 1988, abandoned, said Ser. No. 165,215, is a division of Ser. No. 40,330, Mar. 30, 1993, Pat. No. 5,311,991, which is a continuation of Ser. No. 906,089, Jun. 29, 1992, Pat. No. 5,205,108.

[51] Int. Cl.⁶ .............................. B65B 9/10; B65B 11/02; B65B 11/48; B65B 25/02
[52] U.S. Cl. .................. 53/397; 53/399; 53/461; 53/469
[58] Field of Search ............................ 53/397, 399, 415, 53/419, 417, 459, 567; 229/305, 306

[56] References Cited

U.S. PATENT DOCUMENTS

| | | |
|---|---|---|
| 732,889 | 7/1903 | Paver. |
| 809,299 | 1/1906 | Henke. |
| 1,446,563 | 2/1923 | Hughes. |
| 1,685,393 | 9/1928 | Beadle ................................ 53/459 X |
| 2,048,123 | 7/1936 | Howard. |
| 2,170,147 | 8/1939 | Lane. |
| 2,371,985 | 3/1945 | Freiberg. |
| 2,529,060 | 11/1950 | Trillich. |
| 3,022,605 | 2/1962 | Reynolds. |
| 3,271,922 | 9/1966 | Wallerstein. |
| 3,273,302 | 9/1966 | Walter. |
| 3,403,840 | 10/1968 | Mathes. |
| 3,508,372 | 4/1970 | Wallerstein. |
| 3,525,470 | 8/1970 | Carrigan ............................ 229/306 X |
| 3,793,799 | 2/1974 | Howe, et al.. |
| 4,054,697 | 10/1977 | Reed et al.. |
| 4,118,890 | 10/1978 | Shore. |
| 4,333,267 | 6/1982 | Witte. |
| 4,413,725 | 11/1983 | Bruno. |
| 4,765,123 | 8/1988 | Caldwell ................................ 53/459 |

(List continued on next page.)

FOREIGN PATENT DOCUMENTS 9315979  8/1993  WIPO.

*Primary Examiner*—Horace M. Culver
*Attorney, Agent, or Firm*—Dunlap & Codding, P.C.

[57] ABSTRACT

A method for wrapping a wrapper about a floral grouping wherein the wrapper is a sleeve or sheet of material having a cinching tab or strip of bonding material or both. The floral grouping is placed on the sheet of material which is wrapped thereabout, or the floral grouping is disposed in the interior space of the sleeve. The cinching tab is attached near one end of the sheet or sleeve. The cinching tab has a bonding material disposed thereon which, when the cinching tab is pulled tightly about the wrapper, causes the wrapper to be crimped and tightly bound about the stems of the floral grouping. When a sheet or sleeve having a strip of bonding material is used, the portion of the wrapper having the strip of bonding material is crimped manually or automatically about a portion of the stems of the floral grouping causing portions of the wrapper to overlap and bond to each other causing the wrapper to be held firmly about the stems of the floral grouping. The wrapper may further comprise an additional strip of bonding material for bonding an informational card or label to the wrapper.

33 Claims, 17 Drawing Sheets

U.S. PATENT DOCUMENTS

| | | |
|---|---|---|
| 4,765,464 | 8/1988 | Ristvedt . |
| 4,801,014 | 1/1989 | Meadows . |
| 4,979,351 | 12/1990 | Harris et al. .............................. 53/415 |
| 5,111,638 | 5/1992 | Weder . |
| 5,205,108 | 4/1993 | Weder et al. . |
| 5,307,605 | 5/1994 | Straeter . |
| 5,335,475 | 8/1994 | Weder et al. . |
| 5,335,476 | 8/1994 | Weder . |
| 5,335,477 | 8/1994 | Weder . |
| 5,339,601 | 8/1994 | Weder et al. ............................. 53/397 |
| 5,353,575 | 10/1994 | Stepanek ............................... 53/397 X |
| 5,373,942 | 12/1994 | Weder ................................... 53/399 X |
| 5,428,939 | 7/1995 | Weder et al. ........................... 53/399 X |
| 5,467,573 | 11/1995 | Weder et al. ........................... 53/399 X |

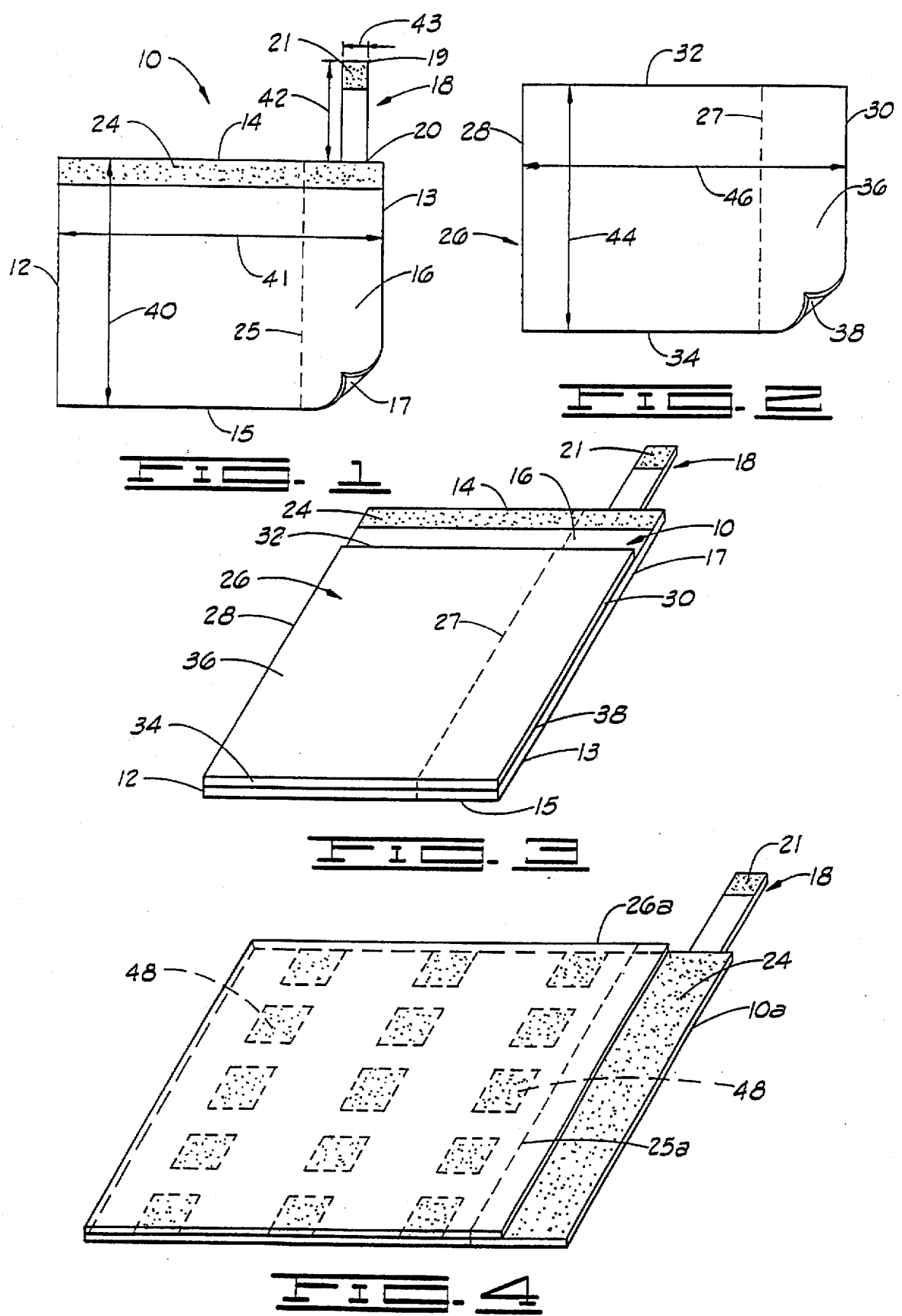

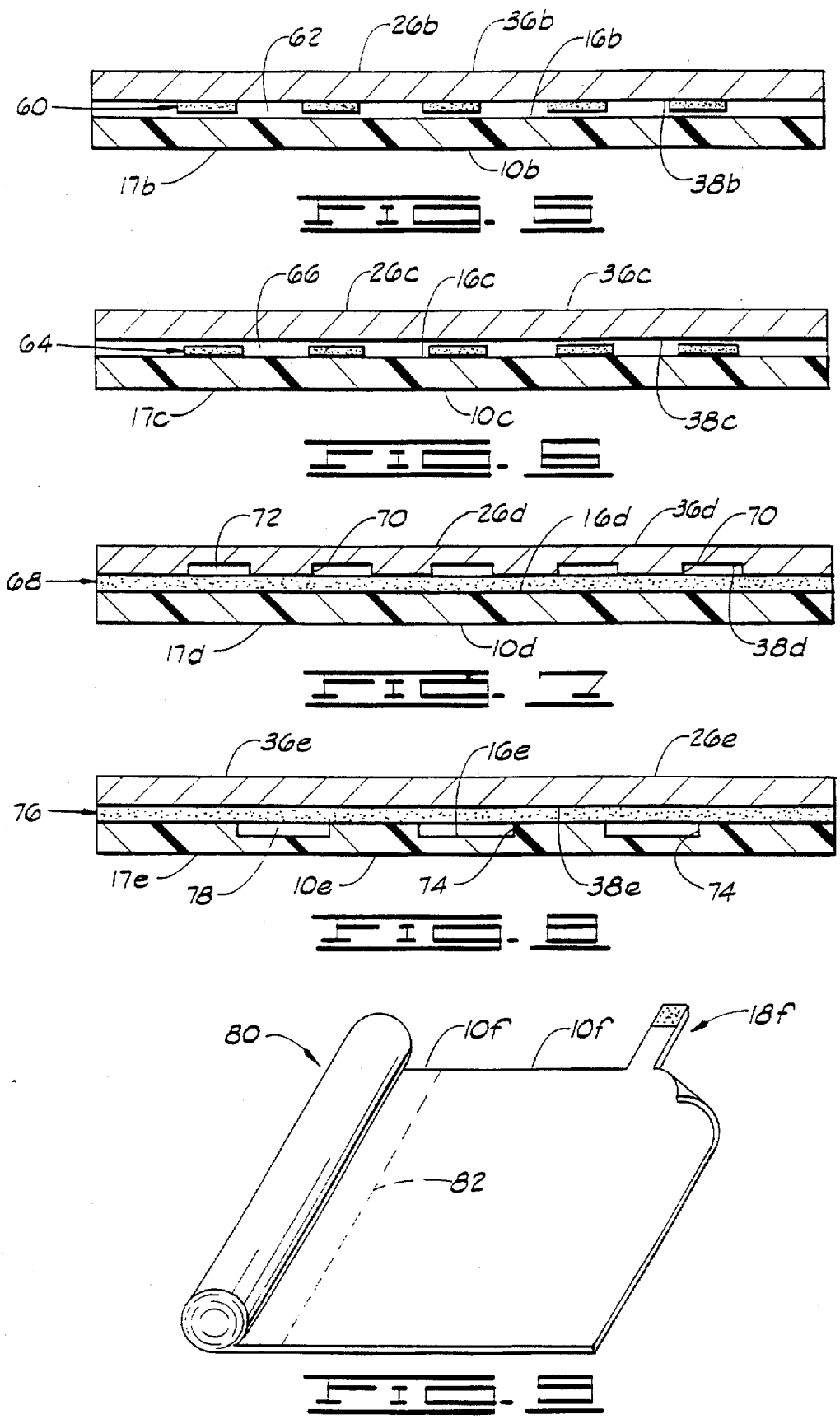

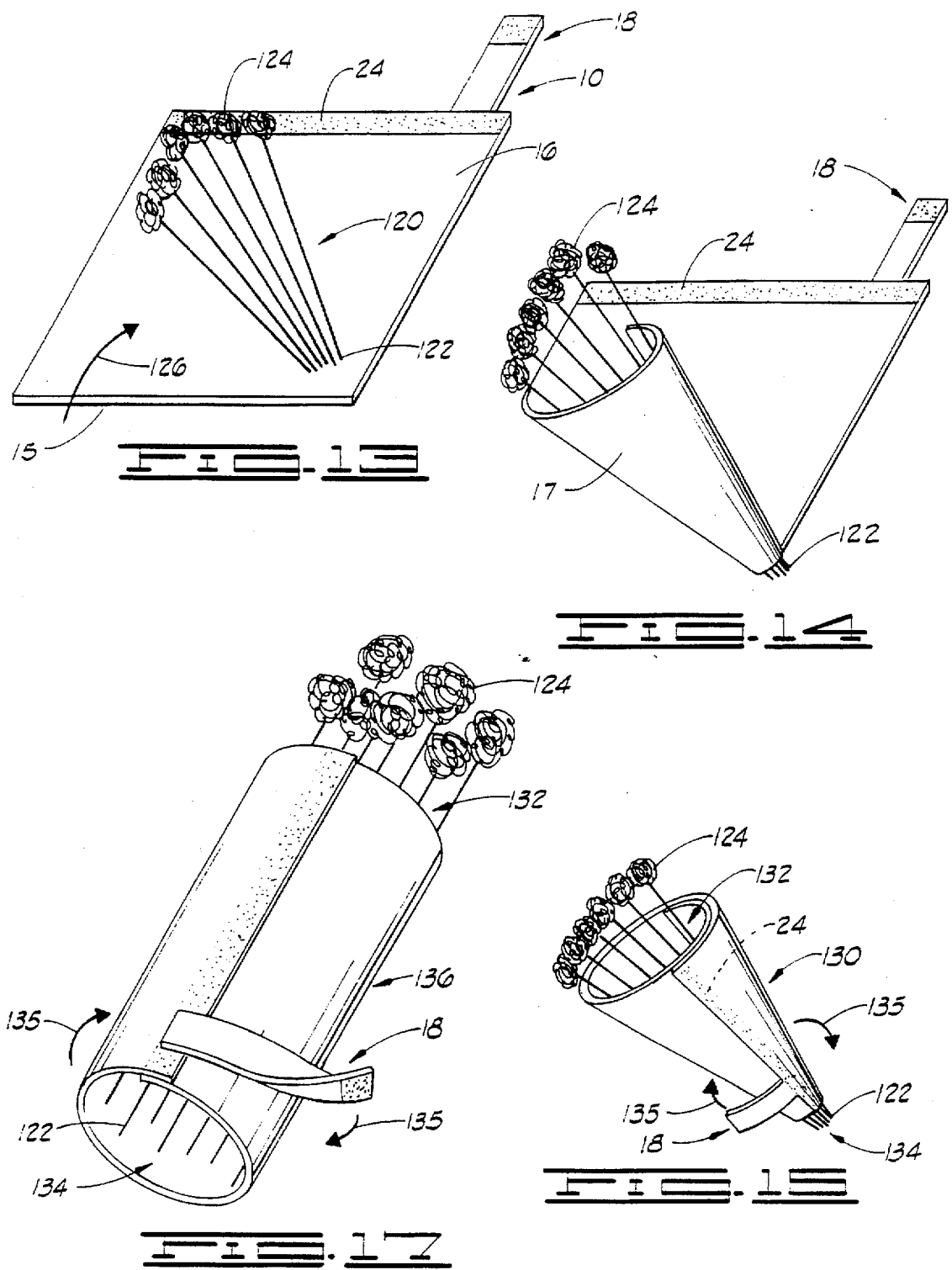

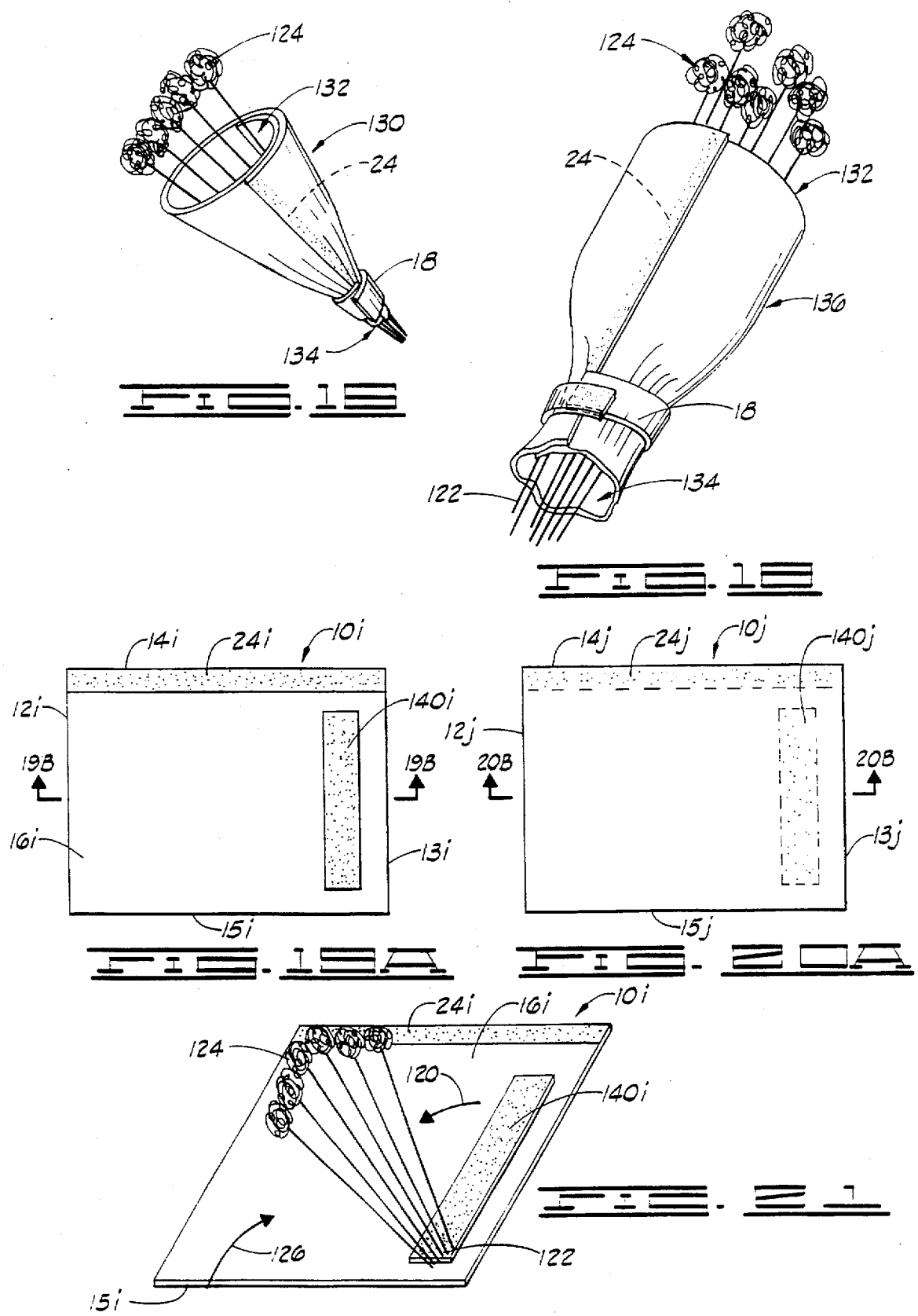

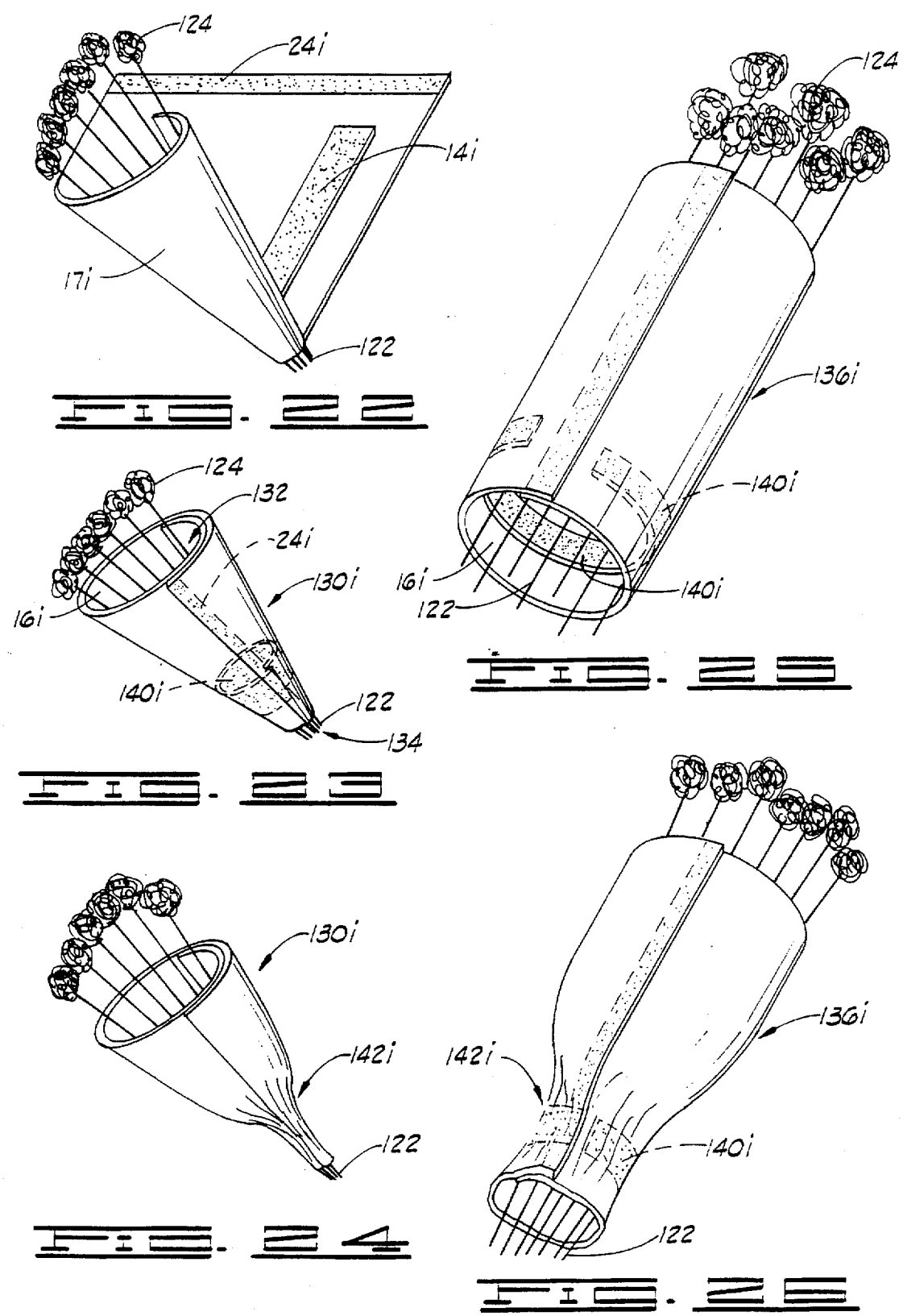

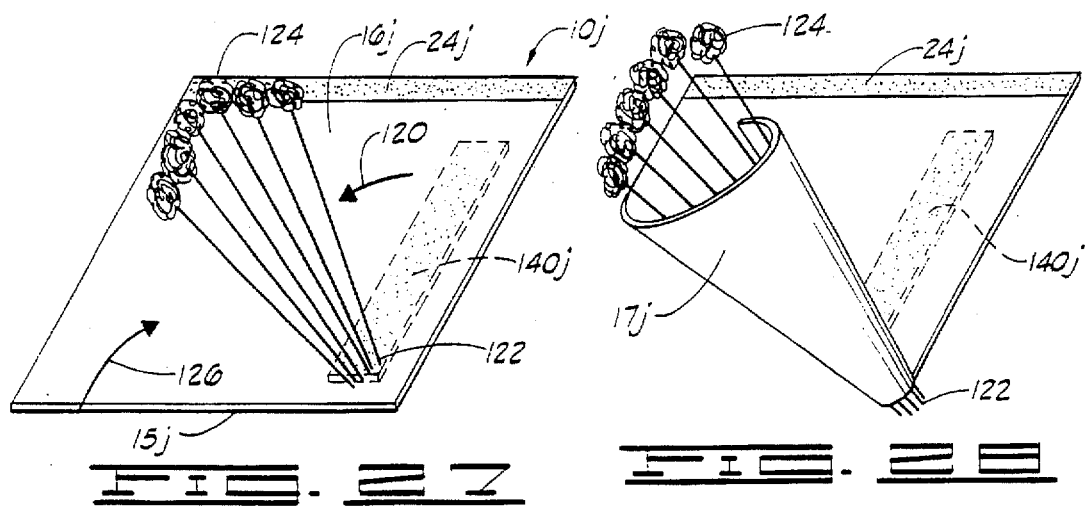
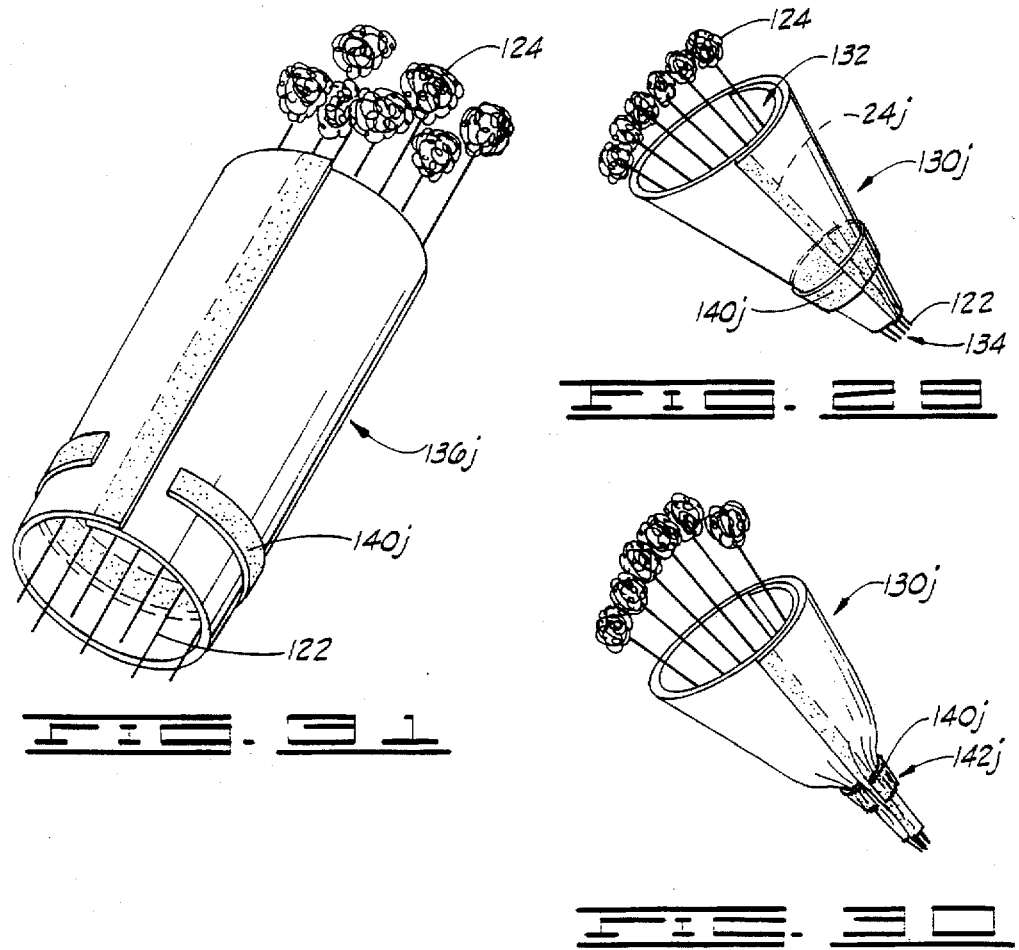

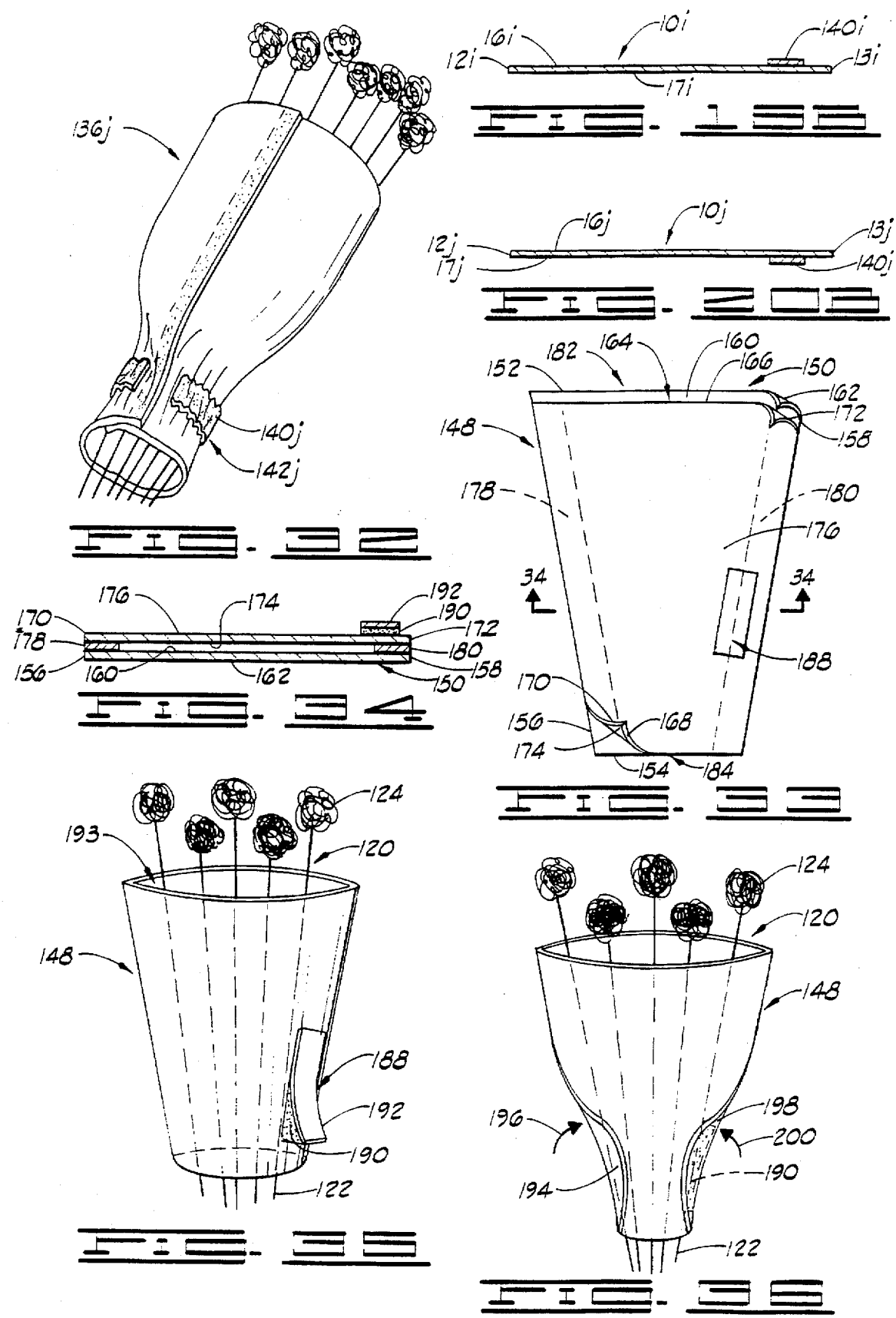

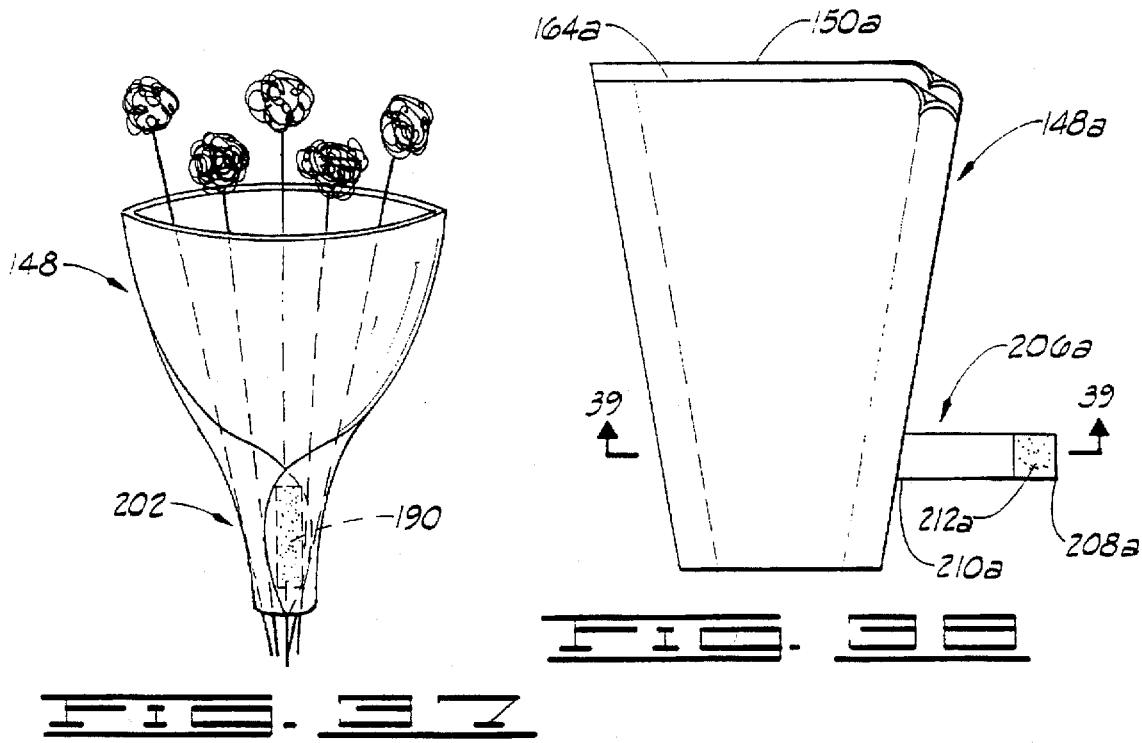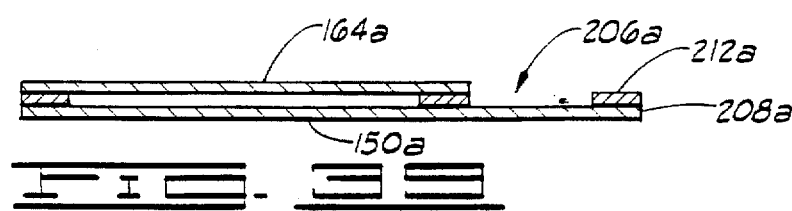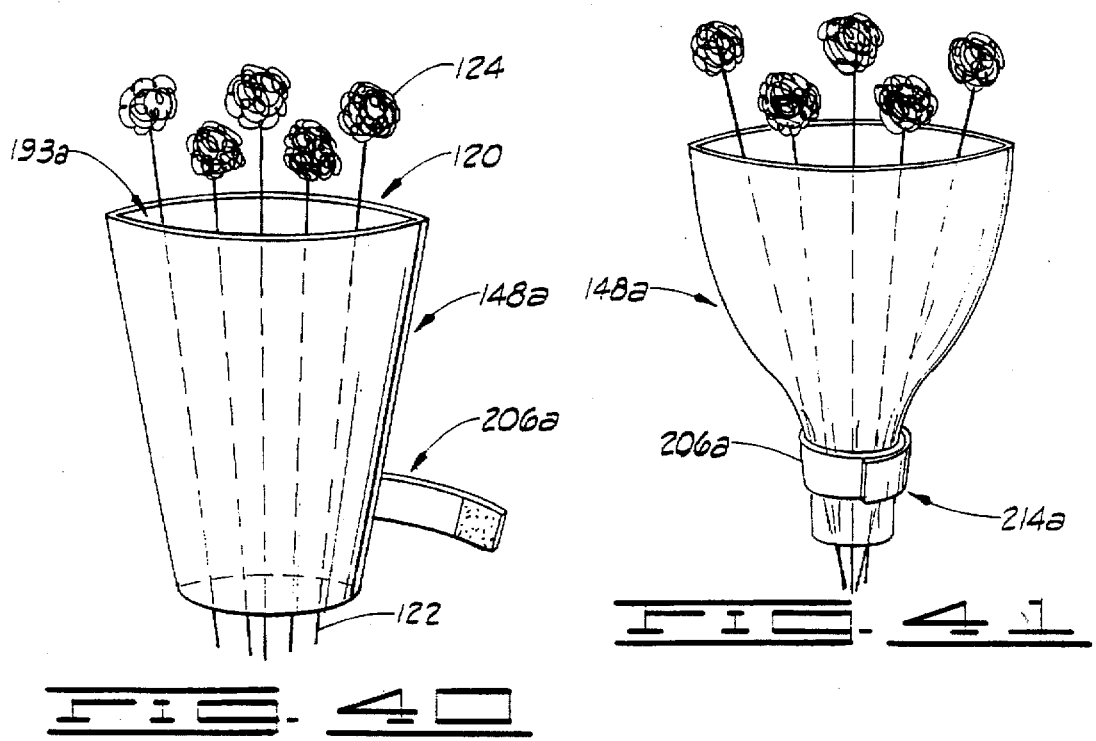

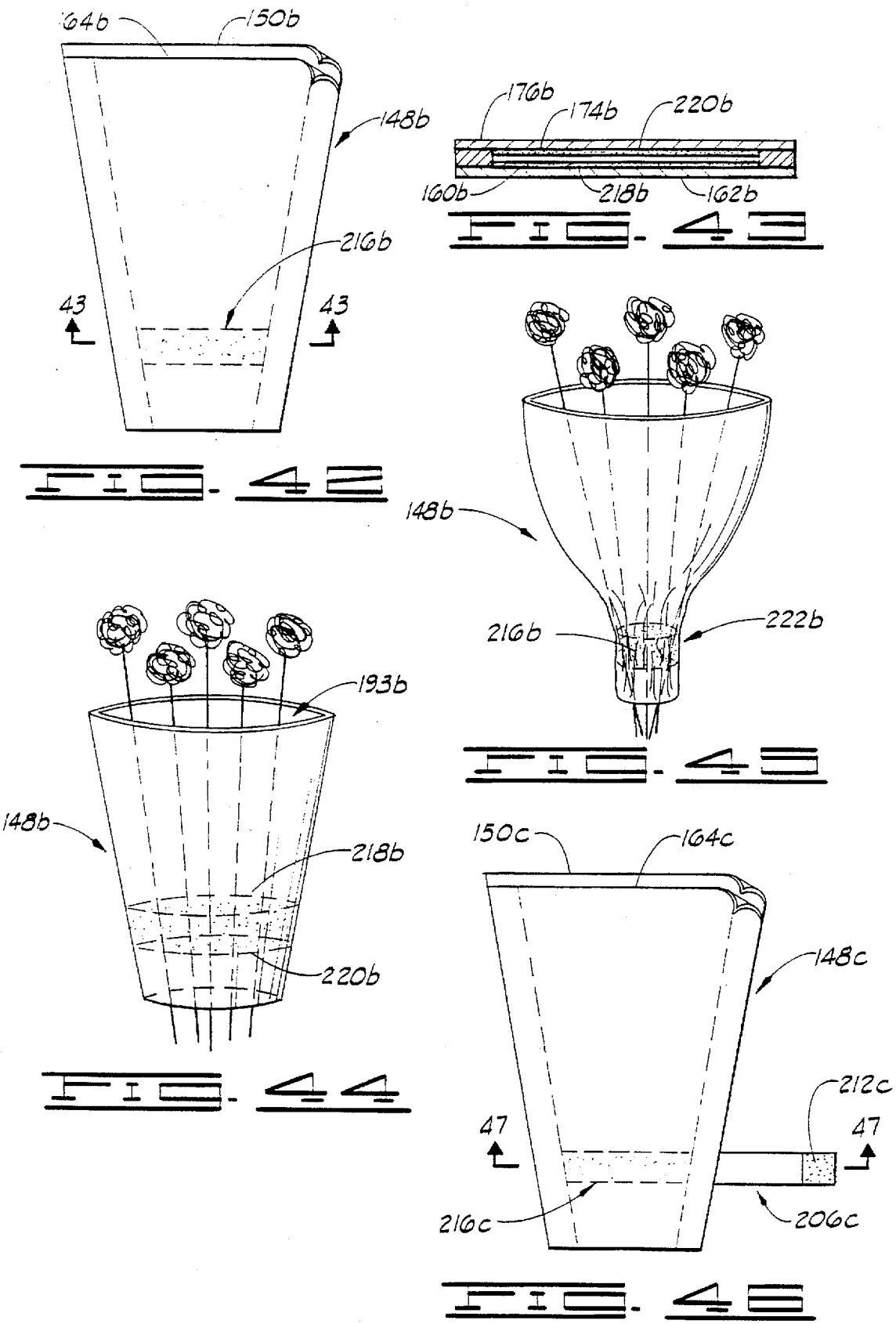

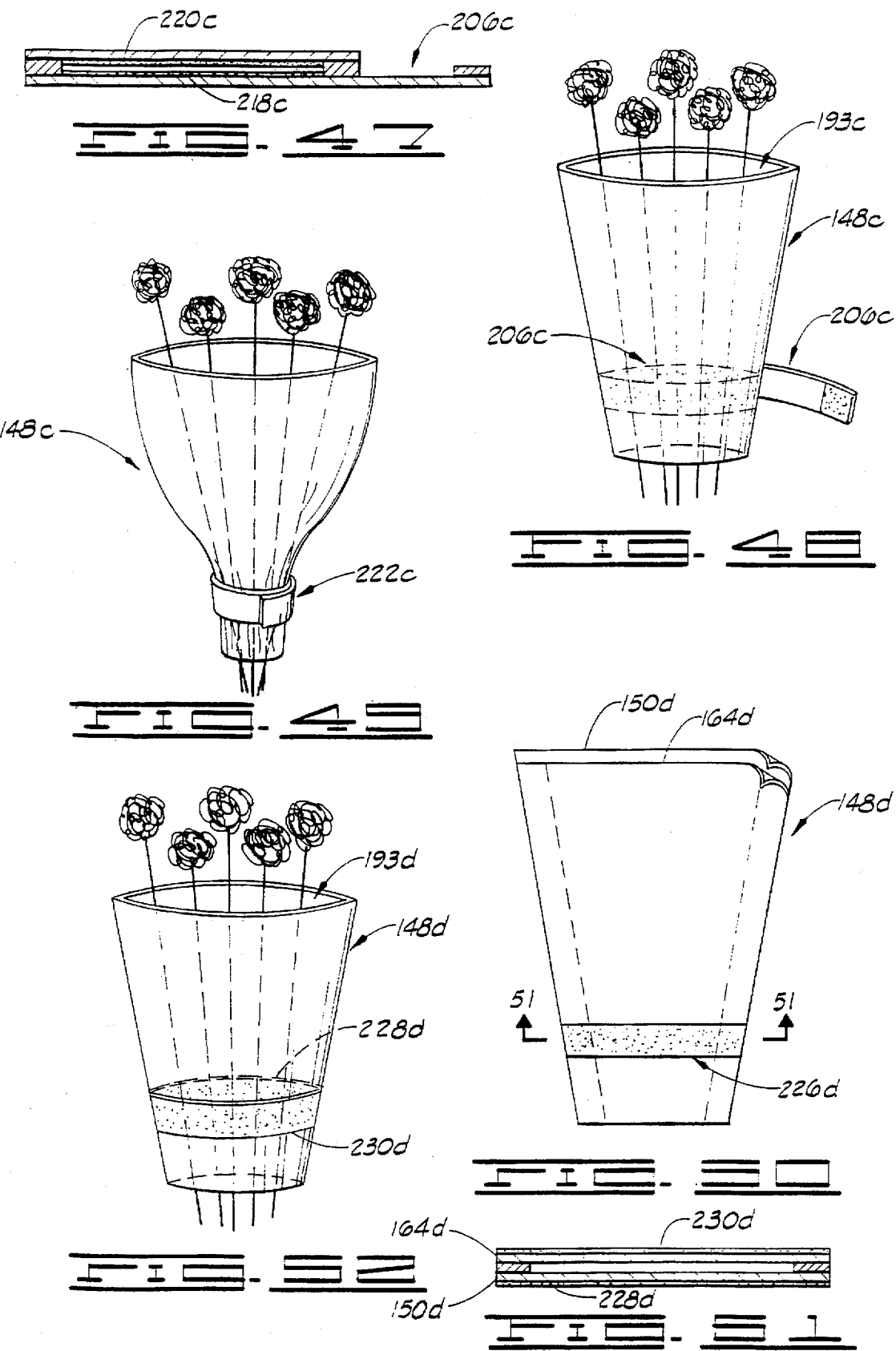

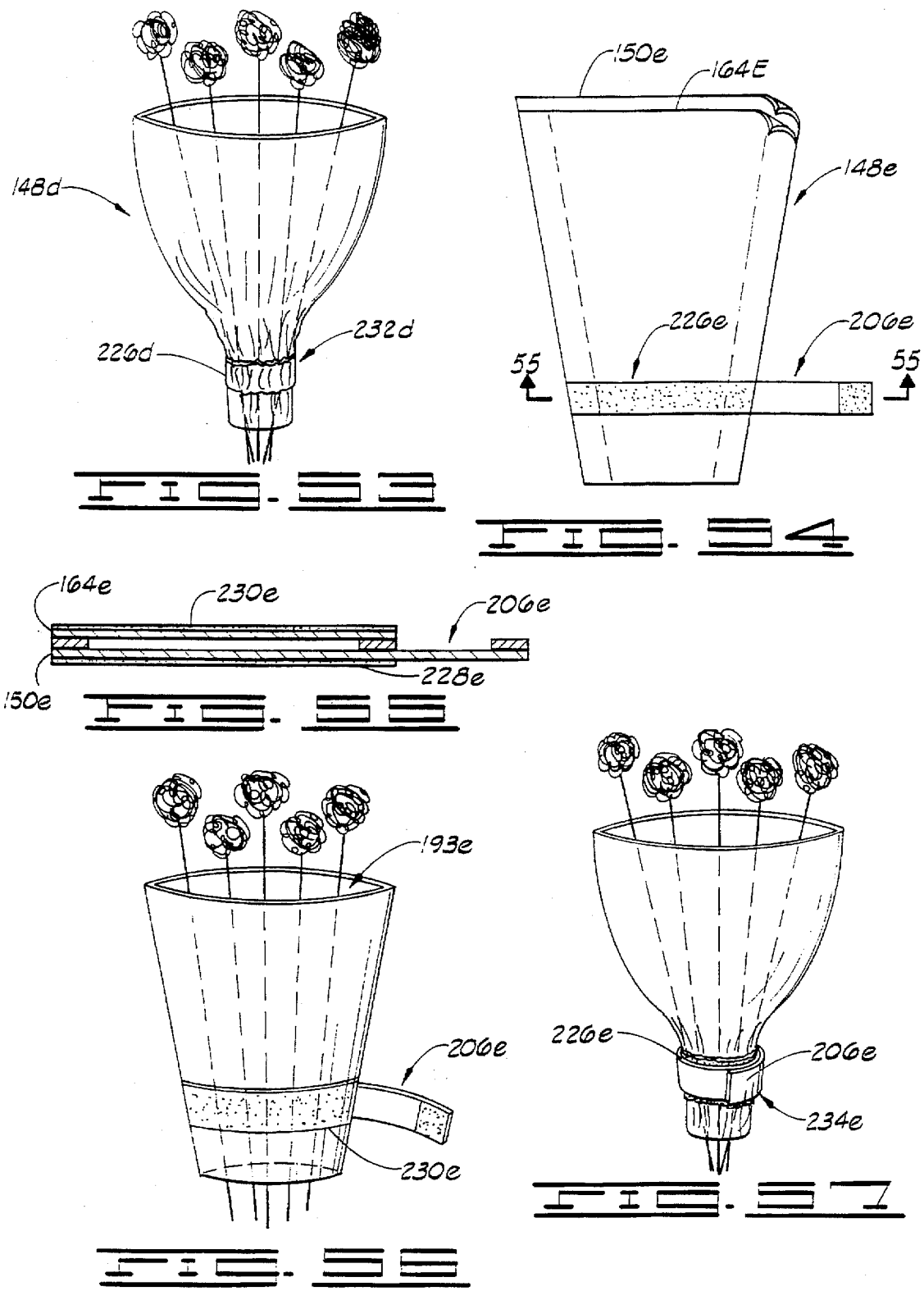

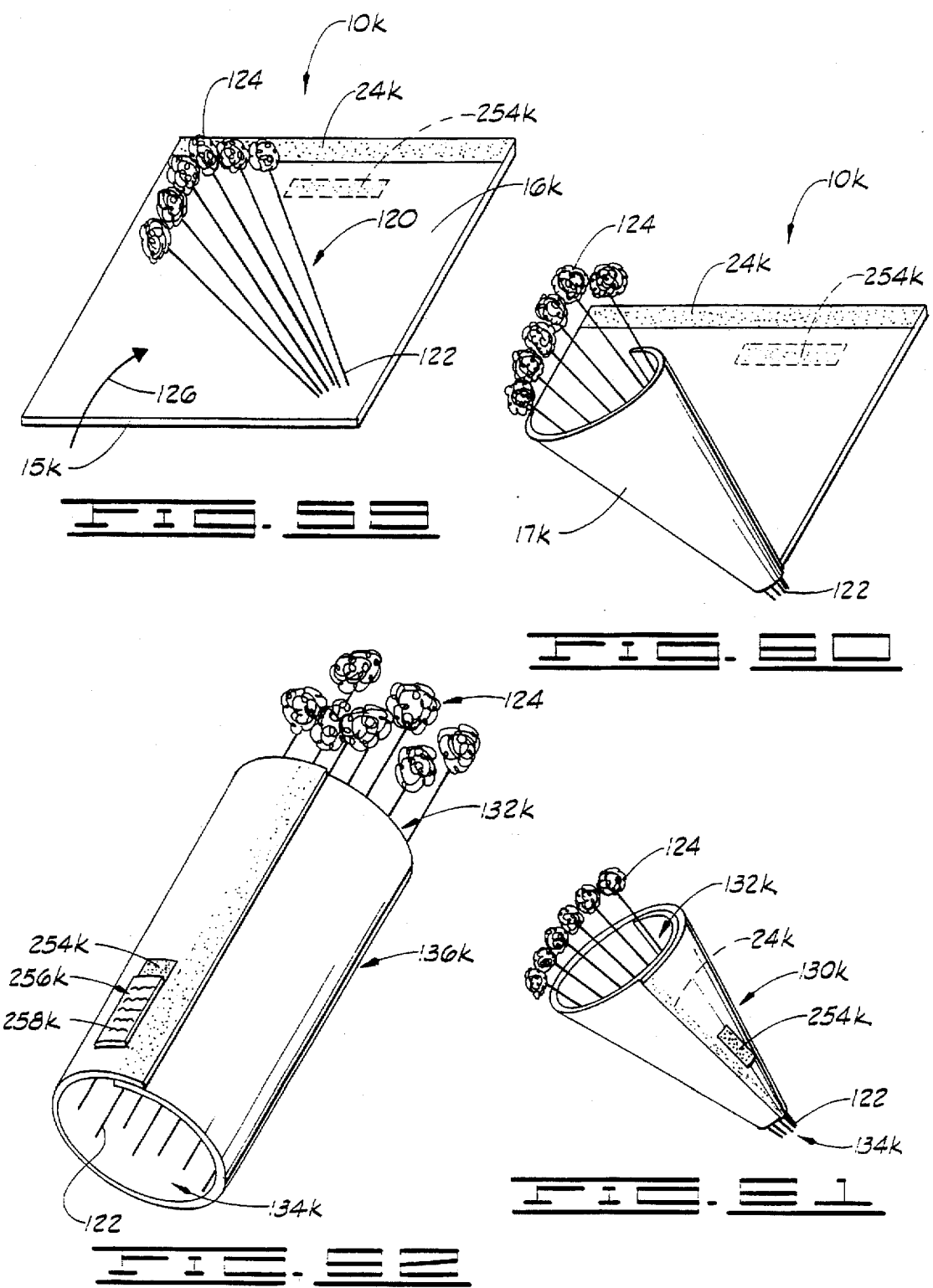

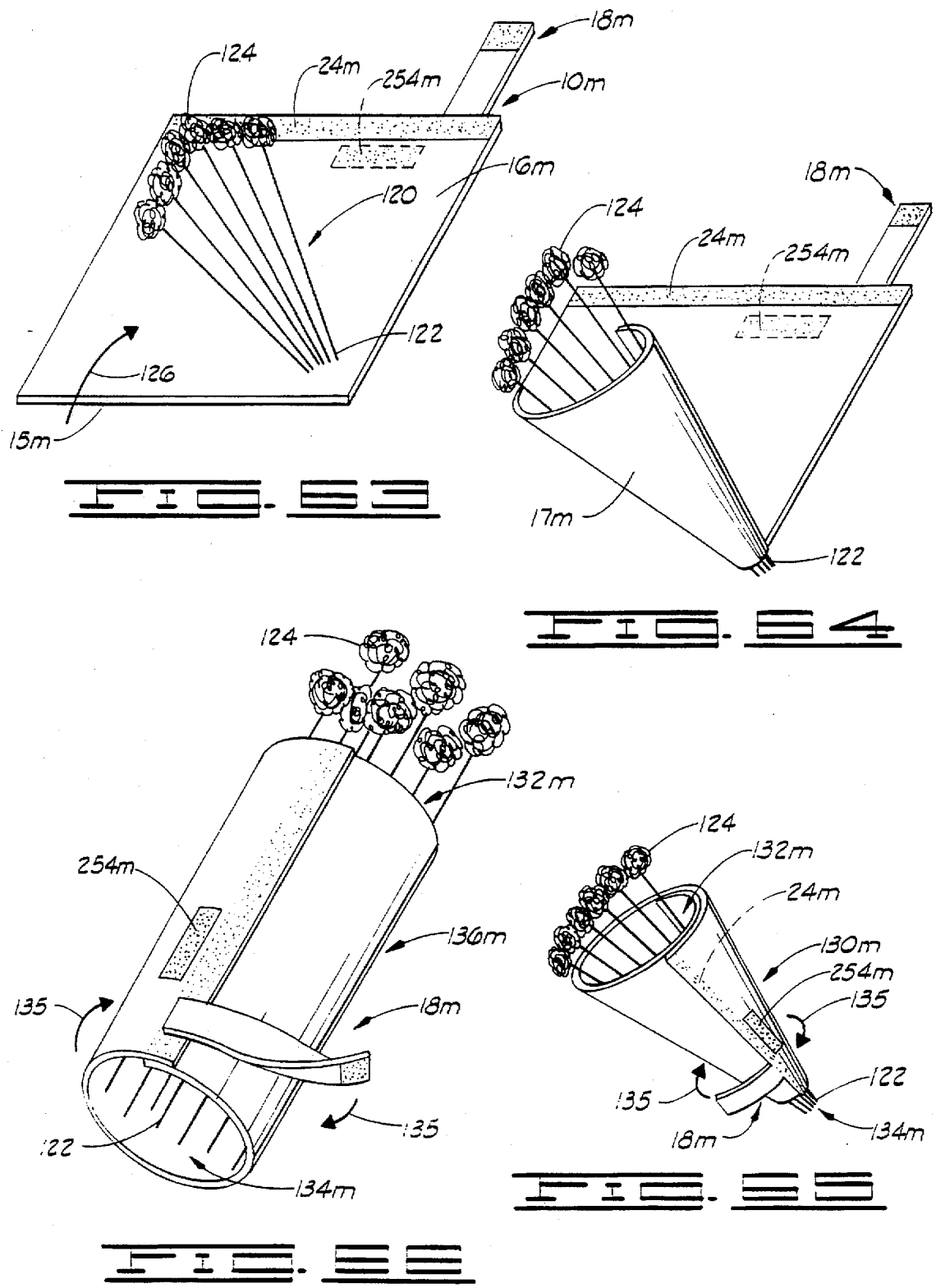

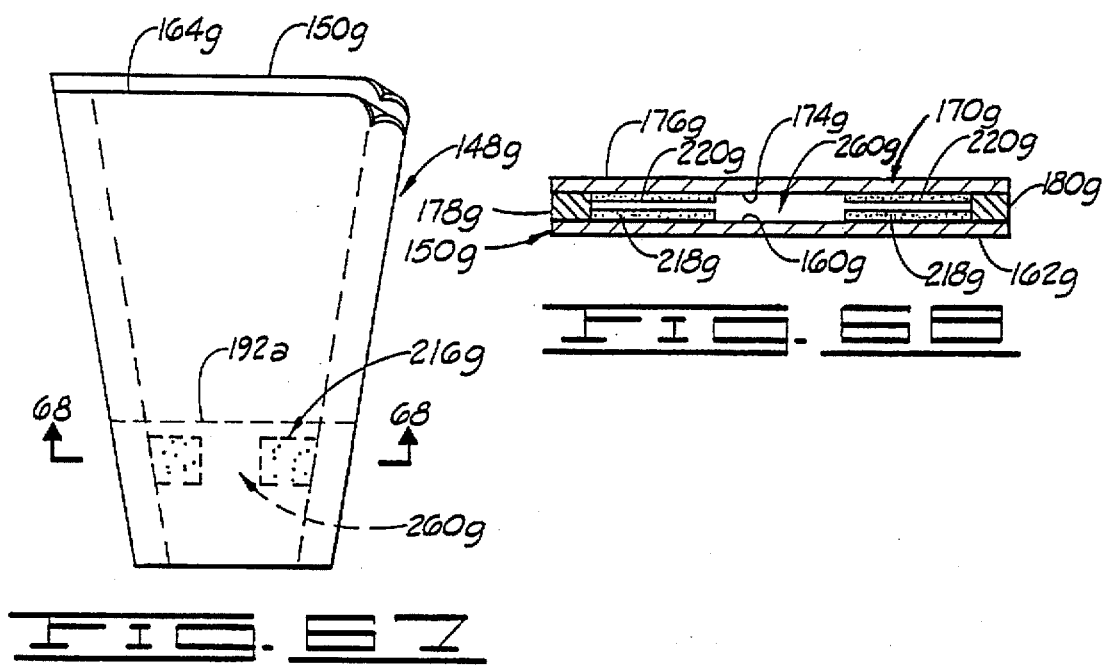
FIG. 67
FIG. 68
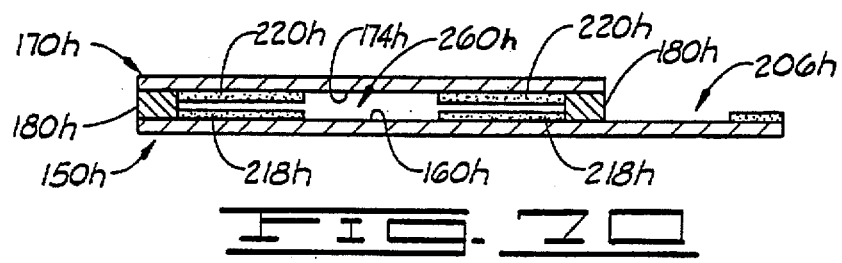
FIG. 70
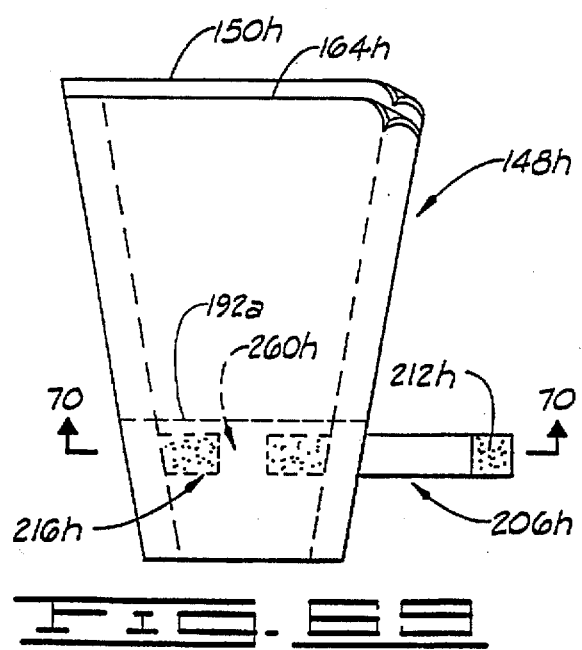
FIG. 69

METHOD FOR CRIMPING A SLEEVE ABOUT A FLORAL GROUPING

CROSS-REFERENCE TO RELATED APPLICATIONS

This application is a continuation of application U.S. Ser. No. 08/095,331, filed Jul. 21, 1993, entitled "Method For Crimping A Wrapper About A Floral Grouping", now U.S. Pat. No. 5,428,939, issued Jul. 4, 1995, which is a continuation-in-part of U.S. Ser. No. 07/963,882, filed Oct. 20, 1992, entitled "Wrapping Material Having A Pull Tab And Pulling Indicia For Wrapping A Floral Arrangement And Method", now U.S. Pat. No. 5,408,803, issued Apr. 25, 1995, which is a continuation-in-part of U.S. Ser. No. 07/649,379, filed Jan. 31, 1991, entitled "Method For Wrapping An Object With A Material Having Pressure Sensitive Adhesive Thereon", now U.S. Pat. No. 5,111,638, issued May 12, 1992, which is a continuation of U.S. Ser. No. 07/249,761, filed Sep. 26, 1988, entitled "Method For Wrapping An Object With A Material Having Pressure Sensitive Adhesive Thereon", now abandoned.

The present application is also a continuation-in-part of U.S. Ser. No. 08/165,215, filed Dec. 10, 1993, entitled "Packaging For Wrapping A Floral Grouping With A Wrap Having A Wrap Opening", now U.S. Pat. No. 5,373,943, issued Dec. 20, 1994, which is a divisional of U.S. Ser. No. 08/040,330, filed Mar. 30, 1993, entitled "A Packaging For Wrapping A Floral Grouping With A Wrap Having A Wrap Opening", now U.S. Pat. No. 5,311,991, issued May 17, 1994, which is a continuation of U.S. Ser. No. 07/906,089, filed Jun. 29, 1992, entitled "Method of Wrapping A Floral Grouping With A Wrapper Having A Central Opening", now U.S. Pat. No. 5,205,108, issued Apr. 27, 1993.

BACKGROUND

The present invention relates generally to the wrapping of a floral grouping with a wrapper and crimping at least a portion of the wrapper about the stem portion of the floral grouping whereby the crimped area of the wrapper is bound together with a bonding material.

Packers of floral groupings such as bouquets often complain that floral grouping wrappers such as commercially-available "sleeves" are not the correct size at the lower end of the sleeve. Therefore, the packer must use some type of band or tie at the lower end of the sleeve to take up the extra sleeve material and to tightly wrap the sleeve about the stems of the floral grouping to inhibit the bouquet from spreading apart or slipping from the wrapper.

Therefore, an object of the present invention is to increase the ease and quickness with which a wrapper can be applied about a floral grouping and held firmly about the stems of the floral grouping without relying on the additional step of applying a separate band or tie about the wrapper, and further to optionally affix an informational label to the wrapper.

SUMMARY

The present invention is a method for wrapping a floral grouping. One version of the invention comprises providing a floral grouping, and a wrapper. The wrapper may be a floral sleeve or it may be a sheet of material. The wrapper has a crimp connector for firmly holding overlapping portions of the wrapper in a crimped position adjacent the stem portion of the floral grouping. The crimp connector may further comprise a bonding material, or a cinching tab, or both. The floral grouping is placed into the interior space of the wrapper and the wrapper is bound about the floral grouping by crimping portions of the wrapper together with the crimp connector thereby forming a crimped portion of the wrapper and firmly binding the wrapper in a position about the floral grouping. The wrapper may further comprise a closure flap extending from the wrapper for enclosing either the upper end or the lower end or alternatively, both the upper end and lower end of the wrapper. The wrapper may further comprise a label bonding material for affixing a label to a portion of the wrapper. When the wrapper is a sheet of material, the sheet of material may have a sheet connector for connecting overlapping portions of the sheet of material in a conical or cylindrical form about the floral grouping.

BRIEF DESCRIPTION OF THE DRAWINGS

FIG. 1 is a plan view of a sheet of material with one end turned up and constructed in accordance with the present invention.

FIG. 2 is a plan view of a second sheet of material with one end turned up and constructed in accordance with the present invention.

FIG. 3 is a perspective view showing the first and the second sheets of material disposed adjacent each other.

FIG. 4 is a perspective view showing bonding areas on the surface of a first sheet or a second sheet which cause bonding of the second sheet and the first sheet.

FIG. 6 is another cross-sectional view of a modified first sheet of material connected to a modified second sheet of material.

FIG. 7 is a cross sectional view of still another modified first sheet of material connected to a modified second sheet of material.

FIG. 8 is another cross-sectional view of yet another modified first sheet of material connected to a modified second sheet of material.

FIG. 9 is a diagrammatic view of a plurality of sheets of material, constructed in accordance with the present invention forming a continuous roll, the roll partially unrolled to reveal a single sheet still attached thereto.

FIG. 13 is a perspective view of a floral arrangement disposed on a sheet of material.

FIG. 14 is a perspective view of the floral arrangement of FIG. 13 being wrapped in one method of wrapping.

FIG. 15 is a perspective view of the floral arrangement wrapped in a conical fashion.

FIG. 16 is a perspective view of the conical floral arrangement with the cinching tab wrapped tightly about the wrapper.

FIG. 17 is a perspective view of another method of using a sheet of material to wrap a floral arrangement in a cylindrical fashion.

FIG. 18 is a perspective view of a cylindrically wrapped floral grouping having the cinching tab wrapped tightly about the wrapper.

FIG. 19A is a plan view of a sheet of material constructed in accordance with the present invention having a first strip and a second strip of bonding material applied to a portion of the upper surface thereof.

FIG. 19B is a side elevational view of the sheet of material of FIG. 19A.

FIG. 20A is a plan view of a sheet of material having a first strip of bonding material on the upper surface and a second strip of bonding material applied to the lower surface thereof.

FIG. 20B is a side elevational view of the embodiment of FIG. 20A.

FIG. 21 is a perspective view of the sheet of material of FIG. 19A and having a floral grouping disposed thereon.

FIG. 22 is a perspective view of the sheet of material and the floral grouping of FIG. 21 showing the method used to wrap the sheet of material about the floral grouping.

FIG. 23 is a perspective view of the sheet of material of FIG. 22 wrapped completely about the floral grouping in a conical fashion.

FIG. 24 is a perspective view of the wrapper and floral grouping of FIG. 23 which indicates how the second bonding portion of the wrapper has been crimped about the stems of the flowers to form a bound area of the wrapper.

FIG. 25 is a perspective view of the sheet of material of FIG. 21 wrapped about a floral grouping in a cylindric manner.

FIG. 26 is a perspective view of the cylindric wrapper of FIG. 25 showing the second bonding material crimped about the stems of the floral grouping.

FIG. 27 is a perspective view of the sheet of material of FIG. 20A and having a floral grouping disposed on the upper surface thereof.

FIG. 28 is a perspective view of the sheet of material and the floral grouping of FIG. 27 showing the method used to wrap the sheet of material about the floral grouping.

FIG. 29 is a perspective view of the sheet of material of FIG. 28 wrapped completely about the floral grouping in a conical fashion.

FIG. 30 is a perspective view of the wrapper and floral grouping of FIG. 29 which indicates how the second bonding portion of the wrapper has been crimped about the stems of the flowers to form a bound area of the wrapper.

FIG. 31 is a perspective view of the sheet of material of FIG. 27 wrapped about a floral grouping in a cylindric manner.

FIG. 32 is a perspective view of the cylindric wrapper of FIG. 31 showing the second bonding material crimped about the stems of the floral grouping.

FIG. 33 is a plan view of a wrapper comprising a first sheet and a second sheet and having a double-sided bonding material and release strip upon one surface of the wrapper.

FIG. 34 is a side elevational view of the wrapper of FIG. 33 indicating the seal between the first and second sheet.

FIG. 35 is a perspective view of the wrapper of FIG. 33 after a floral grouping has been disposed within the wrapper interior and further shows the release strip partially detached from the bonding material on the wrapper.

FIG. 36 is a perspective view of the wrapper and floral grouping of FIG. 33 showing one way in which the wrapper can be folded about the stems of the floral grouping.

FIG. 37 is a perspective view of the wrapper and floral grouping of FIG. 36 once the wrapper has been folded about the stems and cinched using the closure bonding material.

FIG. 38 is a plan view of a wrapper similar to the wrapper of FIG. 33 except having a cinching tab attached thereto rather than a bonding strip.

FIG. 39 is a side elevational view of the wrapper of FIG. 38.

FIG. 40 is a perspective view of the wrapper of FIG. 38 having the floral grouping disposed within the interior thereof.

FIG. 41 is a perspective view of the wrapper and floral grouping of FIG. 40 and further showing the cinching tab cinching a portion of the wrapper tightly about the stems of the floral grouping.

FIG. 42 is a plan view showing a wrapper exactly the same as the wrappers of FIGS. 33 and 38 except having a closure bonding material disposed within the inner surfaces of the wrapper.

FIG. 43 is a side elevational view of the wrapper of FIG. 42 showing the disposition of the closure bonding material upon the inner surfaces of the wrapper.

FIG. 44 is a plan view showing the wrapper of FIG. 42 having a floral grouping disposed within the interior thereof.

FIG. 45 is a perspective view of the wrapper and floral grouping of FIG. 44 and showing the wrapper crimped tightly about the stems of the floral grouping and held thereto by the closure bonding material disposed within the wrapper.

FIG. 46 is a plan view of a wrapper similar to the wrappers shown in FIGS. 38 and 42 and having both a cinching tab and a closure bonding material disposed upon the inner surfaces of the wrapper.

FIG. 47 is a side elevational view of the wrapper of FIG. 46.

FIG. 48 is a perspective view of the wrapper of FIG. 46 and having a floral grouping disposed within the interior thereof.

FIG. 49 is a perspective view of the wrapper and the floral grouping of FIG. 48 after the closure bonding material has been crimped about the stems of the floral grouping and after the cinching tab has been cinched tightly about the stems of the floral grouping.

FIG. 50 is a perspective view of a wrapper similar to the wrapper of FIG. 42 except that the closure bonding material is disposed upon the outer surfaces of the wrapper.

FIG. 51 is a side elevational view of the wrapper of FIG. 50.

FIG. 52 is a perspective view of the wrapper of FIG. 50 showing a floral grouping disposed within the interior thereof.

FIG. 53 is a perspective view of the wrapper and floral grouping of FIG. 52 showing the external closure bonding material crimped tightly and causing the wrapper to be engaged tightly about the stems of the floral grouping.

FIG. 54 is a perspective view of a wrapper comprising elements of the wrapper of FIG. 38 and the wrapper of FIG. 50 wherein the wrapper has both a cinching tab and closure bonding material disposed on a portion of the outer surface of the wrapper.

FIG. 55 is a side elevational view of the wrapper of FIG. 54.

FIG. 56 is a perspective view of the wrapper of FIG. 54 having a floral grouping disposed within the interior thereof.

FIG. 57 is a perspective view of the wrapper and floral grouping of FIG. 56 and showing the wrapper crimped about the stems of the floral grouping by the closure bonding material further showing the cinching tab cinched tightly about the stems of the floral grouping.

FIG. 58 is a plan view of a wrapper constructed in accordance with the present invention having a cinching tab attached thereto further having a lower end flap and an upper end flap.

FIG. 59 is a perspective view of a sheet of material having a bonding material on a surface thereof for holding a card or label having floral indicia thereon.

FIG. 60 is a perspective view of the floral grouping and sheet of FIG. 59 being wrapped in one method of wrapping.

FIG. 61 is a perspective view of the floral grouping and sheet of FIG. 59 wrapped in a conical fashion.

FIG. 62 is a perspective view of another method of using the sheet of material of FIG. 59 to wrap a floral grouping in a cylindrical fashion and showing a card having floral indicia affixed to the wrapper.

FIG. 63 shows a floral grouping and a sheet of material having a closure tab and a strip of material for holding a card or label bearing floral indicia.

FIG. 64 shows the sheet of material of FIG. 63 being wrapped about the floral grouping.

FIG. 65 shows the floral grouping and sheet of material of FIG. 63 wrapped in a conical fashion.

FIG. 66 shows the sheet of material of FIG. 63 wrapped about the floral grouping in a cylindrical fashion.

FIG. 67 is a plan view of a wrapper comprising a first surface and a second surface and having a bonding material disposed upon a portion of the interior portion of the surfaces thereof.

FIG. 68 is a side view of the wrapper of FIG. 67.

FIG. 69 is a plan view of a wrapper having a first surface and a second surface and having a bonding material disposed upon a portion of the interior portions of the surfaces thereof and further having a closure tab.

FIG. 70 is a side view of the wrapper of FIG. 69.

DESCRIPTION

Figure 10:
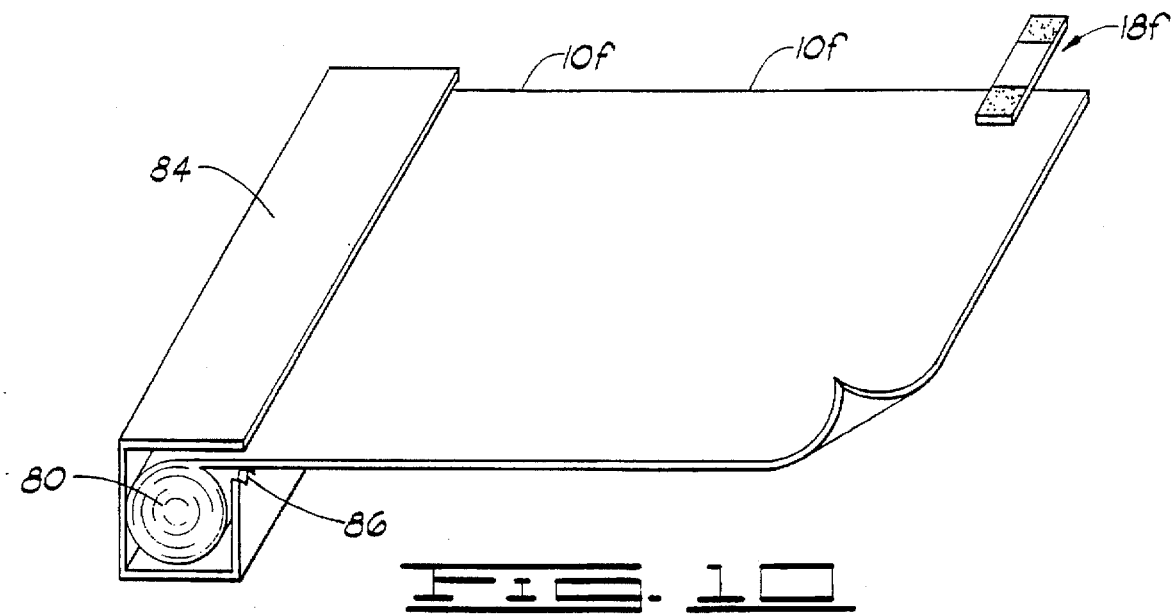
FIG. 10 is a diagrammatic view of a plurality of sheets of material forming a continuous roll of material disposed in a dispenser.

The present invention is a method for wrapping a floral grouping. The first step in the method is providing a floral grouping having an upper end and a stem portion, and providing a wrapper. In one version of the invention the wrapper has a first surface and a second surface such as is typical of the type of wrapper known in the art as a sleeve.

The first surface has an inner surface, an outer surface, an upper end, a lower end, a left-hand side and a right-hand side. The second surface has an inner surface, an outer surface, an upper end, a lower end, a left-hand side and a right-hand side.

The first surface and the second surface are disposed flatwise upon each other with the inner surface of the first surface facing the inner surface of the second surface. Furthermore, the left-hand side of the first surface and the left-hand side of the second surface are sealed together and the right-hand side of the first surface and the right-hand side of the second surface are sealed together forming an interior space between the first surface and the second surface and into which a floral grouping is disposable.

The wrapper further comprises a crimp connector for holding overlapping portions of the wrapper in a crimped position adjacent the stem portion of the floral grouping. The crimp connector further comprises a bonding material.

In the next step, the floral grouping is placed into the interior space of the wrapper. Lastly, the wrapper is bound about the floral grouping by crimping portions of the wrapper together causing at least one portion of the wrapper to overlap at least one other portion of the wrapper such that the crimp connector engages the overlapping portions of the wrapper together in a position surrounding and adjacent the stem portion of the floral grouping forming a crimped portion of the wrapper thereby firmly binding the wrapper in a position about the floral grouping.

The method may further comprise providing a pad of wrappers, the pad having a top wrapper and wherein a strip of bonding material on each wrapper is bondingly connected to a portion of an adjacent wrapper for cooperating to connect the wrappers into the pad. The strip of bonding material on each wrapper releasably connects each wrapper to one other wrapper whereby one of the wrappers can be releasably disconnected from another wrapper by pulling the wrappers apart.

The wrapper used in the method is constructed from a material selected from the group of materials consisting of paper (treated or untreated), cellophane, foil, polymer film, fabric (natural or synthetic, woven or unwoven), or burlap or combinations thereof. Each first or second surface of the wrapper may have a thickness in a range from less than about 1 mil to about 30 mils.

The bonding material of the crimp connector may be selected from the group consisting of a pressure sensitive adhesive or cohesive, a heat sensitive adhesive or cohesive, a sonically sealable adhesive or cohesive, a vibratingly sealing adhesive or cohesive, or a chemically sealing adhesive or cohesive.

The crimp connector may further comprise a cinching tab attached to the wrapper and having the bonding material disposed upon a portion of the cinching tab. Also, the crimp connector may comprise a bonding material disposed upon a portion of at least one surface of the wrapper. More specifically, the crimp connector may further comprise the bonding material disposed upon a portion of the outer surface of at least one of the first or second surfaces of the wrapper.

More preferably, the crimp connector may further comprise the bonding material disposed upon a portion of the inner surface of at least one of the first or second surfaces of the wrapper. Or, the crimp connector may be a bonding material disposed upon portions of both the inner surfaces and the outer surfaces of the first and second surfaces of the wrapper.

In another version of the present invention, the wrapper further comprises a closure flap extending from the wrapper for enclosing either the upper end or the lower end or alternatively, both the upper end and lower end of the wrapper.

In another version of the invention, the crimp connector may comprise both a cinching tab for wrapping about the crimped portion of the wrapper, and a bonding material disposed elsewhere on a surface of the wrapper.

In another version, the wrapper further comprises a label bonding material disposed upon a surface of the wrapper for affixing a label to a portion of the wrapper. This label bonding material may be disposed on a wrapper having a crimp connector as disclosed herein, or on a wrapper not having a crimp connector.

In an alternative version of the invention, the method for wrapping a floral grouping may include the steps of providing a floral grouping having an upper end and a stem portion, and providing a sheet of material. The sheet of material would comprise an upper surface, a lower surface, a sheet connector and a crimp connector.

The sheet connector in this embodiment is disposed on at least a first portion of the upper surface of the sheet of material for connecting portions of the upper surface to portions of the lower surface of the sheet of material during the wrapping step. The crimp connector comprises a bonding material and serves to hold overlapping portions of the sheet of material in a crimped position adjacent the stem portion of the floral grouping.

The next step is to place the floral grouping on the upper surface of the sheet of material and commence wrapping the sheet of material about the floral grouping. The wrapping causes portions of the lower surface of the sheet of material to overlap other portions of the sheet of material and causes bonding of the overlapping portions of the sheet of material by contacting the sheet connector on the upper surface with adjacent overlapping portions of the sheet of material whereby the overlapped portion of the sheet of material is bonded to other overlapping portions of the sheet of material with the sheet of material substantially encompassing and surrounding a substantial portion of the stem portion of the floral grouping forming a wrapper about the floral grouping. Once wrapped, the wrapper generally has an opening extending through the lower end thereof and an opening extending through the upper end thereof with a part of the stem portion of the floral grouping extending through the opening in the lower end and the upper end of the floral grouping being exposed near the opening in the upper end thereof.

The final step is binding the sheet of material (i.e., the wrapper) about the floral grouping by crimping portions of the wrapper together causing at least one portion of the wrapper to overlap at least one other portion of the wrapper. As the crimp connector engages the overlapping portions of the wrapper together in a position surrounding and adjacent the stem portion of the floral grouping, a crimped portion of the wrapper is formed thereby firmly binding the wrapper in a position about the floral grouping.

Another version of the invention comprises a method for wrapping a floral grouping and affixing a label thereto. The method comprises providing a floral grouping, and a wrapper such as described above. The wrapper has a crimp connector such as described above, and a label bonding material which comprises a bonding material disposed upon a portion of a surface of the wrapper for affixing a label to a portion of the wrapper. A label is provided for affixing to the label bonding material. The steps for binding the floral grouping with the wrapper are followed as described earlier, then the label is affixed to the wrapper.

In a similar fashion, the present invention may comprise wrapping a floral grouping with a sheet of material and affixing a label thereto. The sheet of material has a sheet connector as described above and a crimp connector also described above.

The sheet of material further comprises a label bonding material which further comprises a bonding material disposed upon a portion of a surface of the sheet of material for affixing a label to a portion of the sheet of material. A label is provided for affixing to the label bonding material. The floral grouping is placed on the upper surface of the sheet of material. The sheet of material is wrapped about the floral grouping as described above. And the wrapper is bound about the floral grouping by crimping portions of the wrapper together. Finally, the label is affixed to the sheet of material.

In an alternative embodiment, the invention comprises a method for wrapping a floral grouping and affixing a label thereto, wherein the wrapper is a sheet of material having a sheet connector as described above and a label bonding material comprising a bonding material disposed upon a portion of a surface of the sheet of material for affixing a label to a portion of the sheet of material. A label is provided for affixing to the label bonding material, and the floral grouping is placed on the upper surface of the sheet of material. The sheet of material is wrapped about the floral grouping as described above.

Finally, the label is affixed to the label bonding material of the sheet of material which comprises the wrapper. The label bonding material may be disposed upon the upper surface of the sheet of material or upon the lower surface of the sheet of material. Furthermore, the sheet of material may further comprise a closure flap extending from the sheet of material for enclosing the upper end, the lower end or both the upper end and lower end of the wrapper, once the floral grouping has been wrapped with the sheet.

The sheet of material may be provided from a pad of sheets of material, the pad having a top sheet of material and wherein the sheet connector of each sheet of material is bondingly connected to a portion of an adjacent sheet of material for cooperating to connect the sheets of material into the pad. In this instance, the sheet connector on each sheet of material releasably connects each sheet of material to one other sheet of material whereby one of the sheets of material can be releasably disconnected from another sheet of material by pulling the sheets of material apart.

The method may further comprise the step of wrapping the top sheet of material about the floral grouping by placing a portion of the top sheet of material over at least a portion of the floral grouping and rolling the top sheet of material and the floral grouping and wrapping the top sheet of material about the floral grouping, the sheet connector on the top sheet of material being bondingly connected to another portion of the top sheet of material for securing the top sheet of material in a wrapped position about the floral grouping and the top sheet of material being removed from the pad of sheets of material as the top sheet of material is wrapped about the floral grouping.

The sheet of material may further be seen as comprising a first side, a second side, a first end and a second end and the sheet connector is on the upper surface of each sheet of material near one side of the sheet of material and extending a distance therefrom to the other side, and wherein the step of wrapping the top sheet of material about the floral grouping further comprises: placing a portion of the top sheet of material near the first side thereof over a portion of the floral grouping and rolling the top sheet of material and the floral grouping until the top sheet of material is rolled about the floral grouping, the sheet connector on the top sheet of material bindingly connected to a portion of the top sheet of material as the top sheet of material and the floral grouping is rolled over the sheet connector. The top sheet of material may be disconnected from the pad as the top sheet of material and floral grouping are rolled over the pad whereby the top sheet of material is lifted from the pad and the bonding connection between the top sheet of material and a next sheet of material is disconnected.

The method may further comprise wrapping the top sheet of material about the floral grouping and disconnecting the top sheet of material from the pad leaves the next sheet of material forming a new top sheet of material, and wherein the steps of placing the floral grouping on the top sheet of material, and wrapping the top sheet of material about the floral grouping are repeated with other floral groupings until substantially all of the sheets of material in the pad have been wrapped about the floral groupings.

As noted above the sheet of material is constructed from a material selected from the group of materials consisting of paper (treated or untreated), cellophane, foil, polymer film, fabric (natural or synthetic, woven or unwoven), or burlap or combinations thereof. Each sheet of material may have a thickness in a range from less than about 1 mil to about 30 mils.

As above, the bonding material of the sheet connector or of the crimp connector may further comprise a bonding material selected from the group consisting of a pressure sensitive adhesive or cohesive, a heat sensitive adhesive or cohesive, a sonically sealable adhesive or cohesive, a vibratingly sealing adhesive or cohesive, or a chemically sealing adhesive or cohesive.

Also as above, the crimp connector may further comprise a cinching tab attached to the sheet of material and having a bonding material disposed upon a portion thereof. The crimp connector may also comprise a bonding material disposed upon a portion of the upper or lower surface of the sheet of material. The sheet of material may further comprise closure flaps extending from the sheet of material for enclosing the upper end, the lower end or both the upper end and lower end of the wrapper.

The purpose of the crimp connector which comprises a strip of bonding material is to connect and hold overlapping portions of the sheet of material in a position about the floral grouping. Similarly, the purpose of the crimp connector which comprises a cinching tab attached to the sheet of material and having a bonding material disposed on a portion thereof is to hold overlapping portions of the sheet of material in a position about the floral grouping.

It is noted that the crimp connector may comprise either a strip of bonding material disposed upon a portion of a surface of the sheet of material, or it may comprise a cinching tab attached to the sheet of material and having a bonding material disposed on a portion thereof, or the crimp connector may comprise both a cinching tab and a bonding material disposed upon a portion of the sheet of material.

In another version of the invention, the sheet of material may have a label bonding material disposed upon a surface of the sheet of material for affixing a label to a portion of the sheet of material.

The Embodiments of FIGS. 1–3

Shown in FIG. 1 and designated therein by the general reference numeral 10 is a sheet of material. The sheet of material 10 has a first end 12, a second end 13, a first side 14, a second side 15, an upper surface 16 and a lower surface 17.

The sheet of material 10 further comprises a sheet connector and a crimp connector. The sheet connector comprises a closure bonding material which is described in more detail below. The crimp connector, comprises at least a bonding material for connecting overlapping portions of the wrapper in a position about the stems of a floral grouping for binding the wrapper firmly to the floral grouping. In the version of the present invention shown in FIG. 1, the crimp connector comprises a cinching tab 18 having a first end 19, a second end 20 and a bonding material 21 disposed on a portion of the cinching tab 18. The cinching tab 18 is attached at the second end 20 to a portion of the sheet of material 10. In FIG. 1 the tab 18 is shown attached to a portion of the sheet 10 near the first side 14 of the sheet 10. But it will be understood by one of ordinary skill in the art that the tab 18 can be attached to any portion of the sheet 10 which enables the tab 18 to function in accordance with the invention as presently contemplated and as described in further detail below.

A closure bonding material 24 forms the sheet connector and may be disposed on the upper surface 16 of the sheet of material. Alternatively, the sheet of material 10 may be free of such a closure bonding material. As shown in FIG. 1, the closure bonding material 24, if present, is disposed in a preferred embodiment adjacent the first side 14 of the sheet of material 10 and extends between the first and the second ends 12 and 13 of the sheet of material 10. As shown in FIG. 1, the closure bonding material 24 is disposed on the upper surface 16 in a strip of closure bonding material 24, although the closure bonding material 24 also could be applied to the upper surface 16 of the sheet of material 10 in the form of spaced apart spots or the closure bonding material 24 also could be disposed on the upper surface 16 of the sheet of material 10 in any other geometric form and in any pattern including covering the entire upper surface 16 of the sheet of material 10. In this last-mentioned instance, the closure bonding material and the connecting bonding material would be contained within the bonding material covering the sheet of material 10. The term "spot" or "spots" includes any geometric shape of spot including, but not limited to, what is commonly referred to as strips.

The sheet of material 10 has a thickness in a range from about 0.1 mils to about 30 mils. Preferably, the sheet of material 10 has a thickness in a range from about 0.1 mils to about 5 mils.

The sheet of material 10 may be any shape and a square or rectangular shape is shown in FIG. 1 only by way of example. The sheet of material 10 for example only may be square, rectangular, circular or any other geometric shape such as heart shaped, for example only.

The sheet of material 10 may be constructed of a single layer of material or a plurality of layers of the same or different types of materials. Any thickness of the sheet of material 10 may be utilized in accordance with the present invention as long as the sheet of material 10 is wrappable about an object, such as a floral grouping or plant, as described herein. The layers of material comprising the sheet of material 10 may be connected together or laminated or may be separate layers, and the layers of material comprising the sheet of material 10 need not be uniform in shape or composition.

Shown in FIG. 2 is a second sheet of material 26. The second sheet of material 26 has a first end 28, a second end 30, a first side 32, a second side 34, an upper surface 36 and a lower surface 38. The second sheet of material is preferably constructed of paper. The term "paper" as used herein means treated or untreated paper, corrugated paper or cardboard or any other form of paper material.

The first sheet of material 10 has a length 40 extending between the first and the second sides 14 and 15 of the sheet of material 10. The first sheet of material 10 also has a width 41 extending between the first and the second ends 12 and 13 of the first sheet of material 10. The crimp connector, or cinching tab, 18 of the sheet of material 10 has a length 42 and a width 43.

The second sheet of material 26 has a length 44 extending between the first and the second sides 32 and 34 of the second sheet of material 26. The second sheet of material 26 has a width 46 extending between the first and the second ends 28 and 30 of the second sheet of material 26. In a preferred embodiment, the length 44 of the second sheet of material 26 is less than the length 40 of the first sheet of material 10 as shown in FIG. 3 so that, when the first sheet of material 10 is disposed adjacent the second sheet of material 26, a portion of the first sheet of material 10 adjacent the first side 14 thereof extends a distance beyond the first side 32 of the second sheet of material 26, in a manner and for reason which will be described in greater detail below.

The first sheet of material has a thickness in a range from about 0.5 mils to about 30 mils and preferably the thickness of the first sheet of material is in a range from about 0.5 mils to about 10 mils. The first sheet of material 10 is constructed of a material which is flexible.

The second sheet of material 26 has a thickness in a range from about 0.1 mils to about 30 mils and preferably in a range from about 0.1 mils to about 10 mils. The second sheet of material 26 is flexible, but relatively rigid compared to the first sheet of material 10.

The second sheet of material 26 may be any shape and a square or rectangular shape is shown in FIG. 2 only by way of example. The second sheet of material for example only may be square, rectangular, circular or any other geometric shape.

The second sheet of material 26 may be constructed of a single layer of materials or a plurality of layers of the same or different types of materials. Any thickness of the second sheet of material 26 may be utilized in accordance with the present invention as long as the second sheet of material 26 is wrappable about an object such as a floral grouping or plant, as described herein, and as long as the second sheet of material 26 provides the rigidity described herein or the absorbency described herein or both. The layers of material comprising the second sheet of material 26 may be connected together or laminated or may be separate layers.

In operation, when a second sheet of material 26 is desired in addition to the first sheet of material 10, the second sheet of material 26 is placed adjacent the first sheet of material 10 as shown in FIG. 3. In this position, the lower surface 38 of the second sheet of material 26 is disposed adjacent the upper surface 16 of the first sheet of material 10. The width 41 of the first sheet of material 10 is about equal to the width 46 of the second sheet of material 26 so that, when the first and the second sheets of material 10 and 26 are disposed adjacent each other, the first end 28 of the second sheet of material is generally aligned with the first end 12 of the first sheet of material 10, the second end 30 of the second sheet of material 26 is generally aligned with the second end 13 of the first sheet of material 10, the second side 15 of the first sheet of material 10 is generally aligned with the second side 34 of the second sheet of material and the first side 14 of the first sheet of material 10 extends a distance beyond the first side 32 of the second sheet of material 26 so that the closure bonding material 24 on the upper surface 16 of the first sheet of material 10 is exposed and not covered by the second sheet of material 26.

It should be noted that the first and the second sheets of material 10 and 26 each could have virtually identical lengths 40 and 44. In this case, the second sheet of material 26 is disposed on the first sheet of material 10 in such a manner that the second side 34 of the second sheet of material 26 extends a distance beyond the second side 15 of the first sheet of material 10 whereby the first side 14 of the first sheet of material 10 is spaced a distance from the first side 32 of the second sheet of material 26 thereby leaving the closure bonding material 24 on the first sheet of material 10 exposed and not covered by the second sheet of material 26. And multiple sheets of material 10 and 26 may be used. Moreover, when multiple sheets of material 10 and 26 are used in combination, the sheets of material 10 and 26 need not be uniform in size or shape. Finally, it will be appreciated that the sheets of material 10 and 26 shown in all embodiments herein are substantially flat.

As noted earlier, a sheet connector or closure bonding material may be disposed on the upper surface of the first sheet of material 10. The closure bonding material 24 may be applied as a strip or as spots or other shapes. One method for disposing a closure bonding material, in this case an adhesive, is described in U.S. Pat. No. 5,111,637 entitled "Method For Wrapping A Floral Grouping" issued to Weder et al., on May 12, 1992 and which is hereby incorporated herein by reference.

The first sheet of material 10 can be utilized alone or in combination with the second sheet of material 26 to wrap a floral grouping. "Floral grouping" as used herein means cut fresh flowers, artificial flowers, a single flower other fresh and/or artificial plants or other floral materials and may include other secondary plants and/or ornamentation or artificial or natural materials which add to the aesthetics of the overall floral arrangement. The floral grouping comprises a bloom or foliage portion and a stem portion. However, it will be appreciated that the floral grouping may consist of only a single bloom or only foliage (not shown). The term "floral grouping" may be used interchangeably herein with the term "floral arrangement".

The first sheet of material 10 or the second sheet of material 26 may be constructed of a single layer of material or a plurality of layers of the same or different types of materials. Any thickness of the sheet of material 10 or 26 may be utilized in accordance with the present invention as long as the sheet of material 10 or 26 may be wrapped or formed about at least a portion of a portion of a flower pot or a floral grouping, as described herein. Additionally, an insulating material such as bubble film, preferable as one of two or more layers, can be utilized in order to provide additional protection for the item wrapped therein.

In a preferred embodiment, the first sheet of material 10 is constructed from two polypropylene films (a 20"×15" sheet of Mobil 270 ABW white opaque film laminated to a 20"×15" sheet of Mobil 220 AB clear film) having a thickness in a range of from less than about 1.0 mil to about 2.5 mils. The layers of material comprising the first sheet of material 10 may be connected together or laminated or may be separate layers.

The sheet of material 10 is constructed from any suitable wrapping material that is capable of being wrapped about a floral grouping. Preferably, the wrapping material 10 comprises paper (untreated or treated in any manner), cellophane, foil, polymer film, fabric (woven or nonwoven or synthetic or natural), burlap, or combinations thereof.

The term "polymer film" means a man-made polymer such as a polypropylene or a naturally occurring polymer such as cellophane. A polymer film is relatively strong and not as subject to tearing (substantially non-tearable), as might be the case with paper or foil.

The sheet of material 10 or 26 may vary in color. Further, the sheet of material 10 or 26 may consist of designs or decorative patterns which are printed, etched, and/or embossed thereon using inks or other printing materials. An example of an ink which may be applied to the surface of the sheet of material 10 or 26 is described in U.S. Pat. No. 5,147,706 entitled "Water Based Ink On Foil And/Or Synthetic Organic Polymer" issued to Kingman on Sep. 15, 1992 and which is hereby incorporated herein by reference. In addition, the sheet of material 10 or 26 may have various colorings, coatings, flocking and/or metallic finishes, or other decorative surface ornamentation applied separately or simultaneously or may be characterized totally or partially by pearlescent, translucent, transparent, iridescent or the like, qualities. Each of the above-named characteristics may occur alone or in combination and may be applied to the upper and/or lower surface of the sheet of material 10 or 26. Moreover, each surface of the sheet of material 10 or 26 may vary in the combination of such characteristics. The sheet of material 10 or 26 itself may be opaque, translucent or partially clear or tinted transparent.

Embodiments of FIGS. 4–8

Referring now to FIG. 4, a bonding material may be applied to either the upper surface of a first sheet of material or to the lower surface of a second sheet of material in a plurality of patches 48 for the purpose of bonding the upper surface of the first sheet to the lower surface of the second sheet.

Figure 5B:
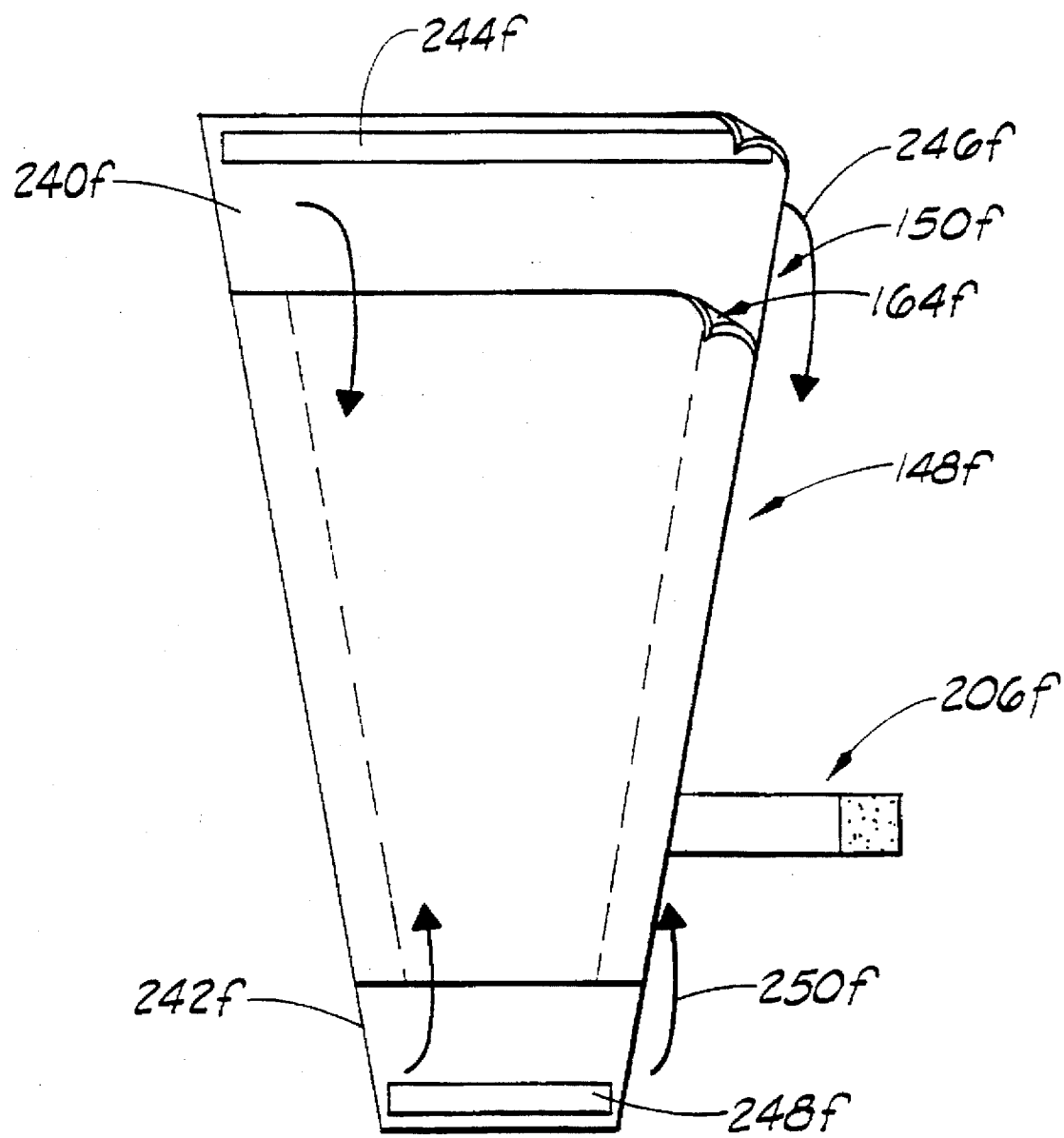
FIG. 5 is a sectional view of a modified first and second sheets of material.

Shown in FIG. 5 is a modified first sheet of material 10b connected to a modified second sheet of material 26b. The first sheet of material 10b is constructed exactly like the sheet of material 10. The second sheet of material 26b is constructed like the sheet of material 26 described in detail before and shown in FIG. 2, except the second sheet of material 26b includes a bonding material 60 disposed on the lower surface 38b of the second sheet of material 26b. The bonding material 60 is in the form of a plurality of spaced apart spots of bonding material 60, similar to that shown in FIG. 4. The lower surface 38b of the second sheet of material 26b is bondingly connected to the upper surface 16b of the first sheet of material 10b by way of the bonding material 60. Since the bonding material 60 is in the form of a plurality of spaced apart spots, a plurality of spaced apart spaces 62 (only one of the spaces 62 being designated by reference numeral in FIG. 5) are formed between the lower surface 38b of the second sheet of material 26b and the upper surface 16b of the first sheet of material 10b. The spaces 62 provide air gaps which form an insulation when the first and the second sheets of material 10b and 26b are wrapped about a floral grouping in a manner and for reasons like that described herein.

Shown in FIG. 6 is a modified first sheet of material 10c connected to a modified second sheet of material 26c. The first sheet of material 10c is constructed exactly like the sheet of material 10 shown in FIG. 1, except the first sheet of material 10c includes a bonding material 64 disposed on the upper surface 16c of the first sheet of material 10c. The bonding material 64 is in the form of a plurality of spaced apart spots of bonding material 64, similar to that shown in FIG. 5. The lower surface 38c of the second sheet of material 26c is bondingly connected to the upper surface 16c of the first sheet of material 10c by way of the bonding material 64. Since the bonding material 64 is in the form of a plurality of spaced apart spots, a plurality of spaces 66 (only one of the spaces 66 being designated by a reference numeral in FIG. 6) are formed between the lower surface 38c of the second sheet of material 26c and the upper surface 16c of the first sheet of material 10c. The spaces 66 provide air gaps which form an insulation when the first and the second sheets of material 10c and 26c are wrapped about a floral grouping in a manner and for reasons like that described herein in connection with FIG. 5.

Shown in FIG. 7 is a modified first sheet of material 10d connected to a modified second sheet of material 26d. The first sheet of material 10d is constructed exactly like the sheet of material shown in FIG. 1, except the first sheet of material 10d includes a bonding material 68 on the upper surface 16d thereof. The second sheet of material 26d is constructed exactly like the second sheet of material 26 shown in FIG. 2, except the second sheet of material 26d includes a plurality of spaced apart raised portions 70. The raised portions 70 may be formed by embossing the second sheet of material 26d or forming corrugations in the second sheet of material 26d or in any other manner desired in any particular application.

The upper surface 16d of the first sheet of material 10d is disposed generally adjacent the lower surface 38d of the second sheet of material 26d or, more particularly, adjacent the raised portions 70 on the second sheet of material 26d. In this position, the raised portions 70 are bonded to the upper surface 16d of the first sheet of material 10d by way of the bonding material 68 to connect the first sheet of material 10d to the second sheet of material 26d.

The spaced apart raised portions 70 on the second sheet of material 26d form a plurality of spaces 72 between the first sheet of material 10d and the second sheet of material 26d in a connected position of the first and the second sheets of material 10d and 26d for providing insulation when the first and second sheets of material 10d and 26d are connected together and wrapped about a floral grouping in a manner like that described herein.

Shown in FIG. 8 is a modified first sheet of material 10e connected to a modified second sheet of material 26e. The first sheet of material 10e is constructed exactly like the sheet of material 10 shown in FIG. 1, except the first sheet of material 10e includes a plurality of spaced apart raised portions 74. The raised portions 74 may be formed in the first sheet of material 10e by embossing the first sheet of material 10e or forming corrugations in the first sheet of material 10e or in any other suitable manner. The second sheet of material 26e is constructed exactly like the second sheet of material 26 shown in FIG. 2, except the second sheet of material 26e includes a bonding material 76 disposed on the lower surface 38e thereof.

In operation, the upper surface 16e of the first sheet of material 10e is disposed generally adjacent the lower surface 38e of the second sheet of material 26e or, more particularly, the raised portions 74 on the first sheet of material 10e are disposed adjacent the lower surface 38e of the second sheet of material 26e. In this position, the first sheet of material 10e is bondingly connected to the second sheet of material 26e by way of the bonding material 76 on the second sheet of material 26e or, more particularly, the bonding material 76 on the second sheet of material 26e bondingly engages and bondingly connects to the raised portions 74 on the first sheet of material 10e to connect the first sheet of material 10e to the second sheet of material 26e. In this connected position of the first sheet of material 10e and the second sheet of material 26e, the raised portions 74 cooperate to form a plurality of spaces 78. Between the first sheet of material 10e and the second sheet of material 26e. The spaces 78 cooperate to provide an insulation when the first and the second sheets of material 10e and 26e are wrapped about a floral grouping or plant in a manner and for reasons like that described herein.

Figure 11:
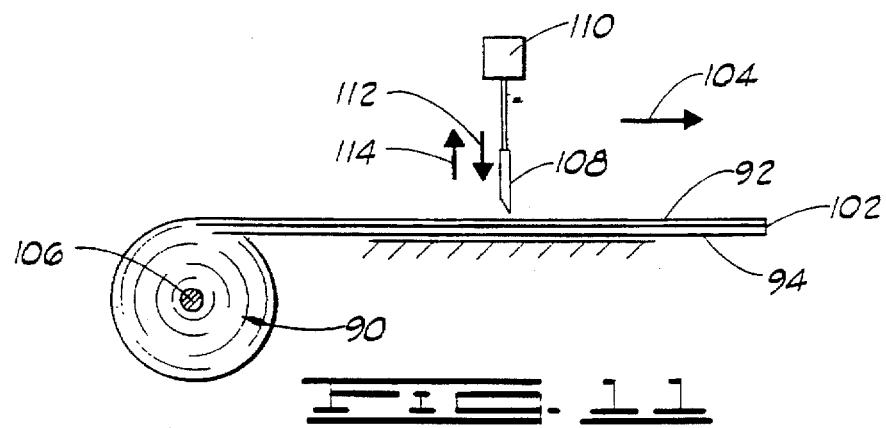
FIG. 11 is a diagrammatic view showing a roll of material wherein the roll of material comprises a first and a second sheet of material constructed in accordance with the present invention disposed in a dispenser (diagrammatically shown in FIG. 11) for dispensing the first and the second sheets of material from the roll of material.

Embodiments of FIGS. 9–11

Referring now to FIG. 9, a plurality of individual sheets of material 10f are connected linearly together to form a roll 80. Preferably, the plurality of sheets of material 10f in the roll 80 are connected by perforations 82, as illustrated in FIG. 9. Such a roll 80 permits one sheet of material 10f to be withdrawn from the roll 80, then severed or disconnected from the roll 80. Alternatively, as shown in FIG. 10, the roll 80 may simply be formed as a continuous roll 80 of wrapping material without perforations, wherein a plurality of sheets of material 10f may be removed from the roll 80 by unrolling a portion of the roll 80, and using a separate cutting element (not shown) to sever the unrolled portion of the roll 80 of material to form the sheet of material 10f. The roll 80 may also be contained within a dispenser 84, as illustrated in FIG. 10. When the roll 80 is disposed in the dispenser 84, a portion of the wrapping material is again unrolled, and a serrated cutting edge 86 contained within the dispenser 84, or a separate cutting element (not shown), severs the unrolled portion of the wrapping material from the roll 80 to form a sheet of material 10f. Any number of sheets of material 10f may form the roll 80 as long as it is possible to withdraw at least one sheet 10f from the roll 80 as described herein.

Each sheet 10f of roll 80 is either equipped with a cinching tab 18f as shown in FIG. 9 wherein the tab 18f is integral with one end or side of a sheet 10f. Alternatively, the cinching tab 18f may be affixable to the sheet 10f after the roll 80 has been unrolled to expose sheet 10f as shown in FIG. 10.

As shown in FIG. 11, the first and the second sheets of material described herein can be provided in the form of a roll of first and second sheets of material wherein the first and the second sheets of material are unrolled from the roll of first and second sheets of material and the first and the second sheets of material are severed from the roll either by perforations at spaced apart locations in the roll or by cutting the first and the second sheets of material from the roll. It also should be noted that additional sheets of material may be combined with the first and the second sheets of material if so desired in a particular application.

Shown in FIG. 11 is a roll of material 90 comprising a first material 92 and a second material 94 with the second material 94 being disposed adjacent the first material 92. The first material 92 is constructed of any of the materials described before with respect to the first sheet of material. The second material 94 is constructed of any of the materials described before with respect to the second sheet of material.

The roll of material 90 may be disposed in a dispenser (not shown) having an opening through which the materials 92 and 94 may be withdrawn from the roll of material 90. A cutting edge (not shown) may be disposed on the dispenser near the opening. The cutting edge may be a sawtooth type of edge or the cutting edge may be any other type of edge or device suitable for cutting a portion of the materials 92 and 94 from the roll of material 90 and the cutting edge may be connected to the dispenser or may be a separate component if desired in a particular application.

The roll of material 90 has a leading edge 102. In operation, the leading edge 102 is gripped or a portion of the first and/or the second materials are gripped and the first and the second materials are unrolled and withdrawn from the roll of material 90 in a direction 104. The first and the second materials 92 and 94 are withdrawn or unrolled from the roll of material 90 until a desired length of the first and the second materials 92 and 94 have been withdrawn from the roll of material 90. In this position, a portion of the first and the second materials 92 and 94 are disposed adjacent the cutting edge. The first and the second materials 92 and 94 then are maneuvered to pass the first and the second materials 92 and 94 over the cutting edge thereby severing a portion of the material extending a distance from the leading edge 102 thereof from the roll of material 90. The portion of the first and the second materials 92 and 94 withdrawn from the roll of material 90 and severed from the roll of material 90 comprise the first and the second sheets of material as described herein.

The first and the second materials 92 and 94 in the roll of material 90 may be connected or unconnected. Further, the roll of material 90 may comprise two rolls of material with one of the rolls of material comprising the first material 92 and the other roll of material comprising the second material 94. In this last-mentioned embodiment, the first material 92 is withdrawn from the first roll of material and the second material 94 is withdrawn from the second roll of material about simultaneously so that the first and the second materials 92 and 94 are provided in a manner as generally shown in FIG. 11 for severing from the first and second rolls of material to provide the first and the second sheets of material as described herein. The term "roll of material" as used herein is intended to encompass two or more rolls in the manner generally described.

As shown in FIG. 11 the roll of material 90 is supported on a generally mounted shaft 106. The first and the second sheets of material 92 and 94 are withdrawn from the roll of material 90 until a predetermined length of the first and the second materials 92 and 94 have been withdrawn from the roll of material 90. In this position, a portion of the first and the second materials 92 and 94 are disposed under a knife edge 108. The knife edge 108 is connected to an actuator 110 adapted to move the knife edge 108 in a direction 112 and in a direction 114. When the predetermined length of the first and the second materials 92 and 94 have been withdrawn from the roll of material 90, the actuator 110 actuates to move the knife edge 108 in the direction 112 to a position wherein the knife edge 108 severingly engages the materials 92 and 94 to severingly cut a portion of the first and the second materials 92 and 94 from the roll of materials 90 to provide the first and the second sheets of material as described herein. The actuator 110 may comprise a hydraulic or pneumatic cylinder or a motor and gear arrangement or any other form of arrangement suitable for moving the knife edge 108 in the directions 112 and 114. After the knife edge 108 has cuttingly severed the desired portion of the first and the second sheets of material 92 and 94 from the roll of material 90, the actuator 110 is actuated to move the knife edge 108 in the direction 114 to a storage position disposed a distance above the first and the second materials 92 and 94 as opposed to the cutting position previously described.

Figure 12:
FIG. 12 is a side elevational view of a pad of first and second sheets of material constructed in accordance with the present invention.

Embodiment of FIG. 12

Shown in FIG. 12 is a pad 116 of first sheets of material designated by the reference numerals 10f, 10g, and 10h in FIG. 12 and a plurality of second sheets of material designated in FIG. 12 by the reference numerals 26f, 26g and 26h. The first sheets of material 10f, 10g and 10h may be constructed like the sheet of material 10 shown in FIG. 1 and described in detail before and the second sheets of material 26f, 26g and 26h may be constructed like the second sheet of material 26 shown in FIG. 2 and described in detail before, or like any of the other first and the second sheets of material described herein. The first and the second sheets of material 10f, 10g, 10h, 26f, 26g and 26h are connected in the form of a pad 116 with the closure bonding material 24f, 24g and 24h cooperating to connect the first sheets of material 10f, 10g and 10h in the form of the pad 116. The second sheets of material 26f, 26g and 26h may be connected to the respective first sheets of material 10f, 10g and 10h or may be interleaved between the adjacent first sheets of material 10f, 10g and 10h in the pad 116. In the alternative, the second sheets of material 26f, 26g and 26h may be connected to form the pad 116 with the first sheets of material 10f, 10g and 10h being interleaved in the respective second sheets of material 26f, 26g and 26h and/or connected thereto. In operation, the floral grouping may be placed on the top sheet of material in the pad 116 and the first and the second sheets of material comprising the top sheet of material may be wrapped about the floral grouping and removed from the pad 116. In the alternative, one of the first sheets of material 10f, 10g or 10h along with the adjacent second sheet of material 26f, 26g 26h may be removed from the pad 116 and then wrapped about the floral grouping or flower pot.

Embodiments of FIGS. 13–18

As noted above, the present invention contemplates using the sheet of material 10 having a crimp connector comprising a cinching tab 18 to wrap a floral grouping. A floral grouping 120 having a stem end 122 and a bloom end 124 (FIG. 13) is disposed on the upper surface 16 of the sheet of material 10. The sheet of material 10 then is wrapped about the floral grouping 120 by taking the second side 15 of the sheet of material 10 and rolling the sheet of material 10 in a direction 126 about the floral grouping 120 (FIG. 14). The sheet of material 10 is continued to be rolled about the floral grouping 120 until a portion of the sheet connector, i.e., the closure bonding material 24, is disposed adjacent a portion of the lower surface 17 of the sheet of material 10 and brought into bonding contact or engagement therewith (FIG. 15) thereby bondingly connecting the closure bonding material 24 on the upper surface 16 of the sheet of material 10 to a portion of the lower surface 17 of the sheet of material 10 for cooperating to secure the first sheet of material 10 in a wrapped condition about the floral grouping 120 to provide a wrapper 130 wrapped about the floral grouping 120, as shown in FIG. 15.

Such a method of wrapping is shown and described in detail in U.S. Pat. No. 5,181,364, entitled, "Wrapping a Floral Grouping With Sheets Having Adhesive Or Cohesive Material Applied Thereto," which issued Jan. 26, 1993. U.S. Pat. No. 5,181,364 is hereby incorporated by reference herein.

In the wrapped condition with the sheet of material 10 wrapped about the floral grouping 120 as shown in FIG. 15, the wrapper 130 forms a conical shape with an open upper end 132 and an open lower end 134. The wrapper 130 covers a portion of the bloom end 124 of the floral grouping 120. A portion of the stem end 122 of the floral grouping 120 extends through the opened lower end 134 of the wrapper 130.

The wrapper 130 is caused to be more tightly wrapped about the floral grouping 120 by grasping the cinching tab 18 and pulling the cinching tab 18 in a direction 135 about the lower end of the wrapper 130. Once the tab 18 has been wrapped tightly about the lower end of the wrapper 130, the portion of the tab 18 having the bonding material 21 applied thereto is engagingly pressed against the wrapper 130 to affix the tab 18 to the wrapper 130 thereby causing the lower end of the wrapper 130 to be crimpingly wrapped about the stem end 122 of the floral grouping 120 for inhibiting the floral grouping 120 from slipping or moving excessively within the wrapper 130.

The crimping may be conducted as the floral grouping 120 is wrapped (not shown), or the crimping may be conducted after the floral grouping is wrapped by crimping the sheet of material 10 in the area of the bonding material 24. Such crimping may be conducted by hand, by grasping and substantially encompassing with one or more hands the lower end of the wrapper 130, in the area of the bonding material 24, and evenly and firmly squeezing the sheet of material 10 about the area of the bonding material 24, thereby pressing and gathering both the sheet of material 10 against itself and against the stem end 122 of the floral grouping 120 and the bonding material 24 against itself and against the stem end 122 of the floral grouping 120. The wrapper 130 may also be crimped by using both a crimping motion and a turning motion to create a twisted crimping (not shown), resulting in a wrapper 130 which is both crimped, as described previously, and which is twisted about the stem end 122 (the sheet of material 10 near the stem end 122 being rotated between about one-eighth of a turn to about a full turn) primarily in the area near the stem end 122 of the floral grouping 120. Such crimping as described above may also be conducted by any instrument or machine used for gathering or crimping materials. The cinching tab 18 may be utilized to both crimp the wrapper 130 in a crimped condition, as described above, that is, the cinching tab may perform the crimping, as well as retaining the wrapper 130 in a crimped condition.

At least a portion of the floral grouping 120 is disposed within the wrapper 130. In some applications, the stem end 122 of the floral grouping 120 extends through the open lower end 134 of the wrapper 130, as described before. The bloom end 124 of the floral grouping 120 is disposed near the open upper end 132 of the floral grouping 120 and the bloom end 124 of the floral grouping 120 is visible via the open upper end 132 of the wrapper 130. In some instances, the bloom end 124 of the floral grouping 120 may extend beyond the open upper end 132 of the wrapper 130. In some applications, the upper end 132 of the wrapper 130 may be closed if desired. In some applications, the lower end 134 of the wrapper 130 may be closed if desired.

The wrapper 130, formed from the sheet of material 10, as shown in FIGS. 15 and 16, is generally conically shaped. The sheet of material 10 may also be wrapped about the floral grouping 120 to form a cylindrically shaped wrapper 136 as shown in FIGS. 17–18 or any other shaped wrapper if desired in a particular application. When the sheet of material 10 is wrapped cylindrically about the floral grouping 120 as shown in FIG. 17, the cinching tab 18 is disposed about the wrapper 130 in exactly the same way as the conically shaped wrapper 130 shown in FIG. 16 yet still maintaining a generally cylindric shape as shown in FIG. 18.

When the floral grouping 120 is wrapped using both a first sheet of material 10 and a second sheet material 26, the floral grouping 120 is disposed on the upper surface 36 of the second sheet of material 26. First and second sheets of material which are placed similarly to the placement shown in FIG. 3 are then wrapped about the floral grouping 120 in substantially the same manner that a single first sheet of material 10 is wrapped about the floral grouping 120 to arrive at a conically or cylindrically wrapped floral grouping as described above whereby a closure bonding material 24 on the first sheet is brought into bonding contact or engagement therewith thereby bondingly connecting the closure bonding material 24 on the upper surface 16 of the first sheet of material 10 to a position on the lower surface 17 of the first sheet of material 10.

When used in the context of wrapping a floral grouping, the second sheet of material 26 is preferably constructed of a relatively rigid, flexible sheet of material capable of being wrapped about the floral grouping 120 whereby the second sheet of material 26 cooperates to add rigidity to the first and the second sheets of material 10 and 26 for cooperating to support the first and the second sheets of material 10 and 26 wrapped about the floral grouping 120 in the form of the wrapper 130. Also, the second sheet of material 26 preferably is constructed of an insulation type of material for providing insulation when the first and the second sheets of material 10 and 26 are wrapped about the floral grouping 120 to form the wrapper 130. The second sheet of material 26 also preferably is capable of absorbing water so that, when the first and the second sheets of material 10 and 26 are wrapped about the floral grouping 120 to form the wrapper 130, the second sheet of material 26 is disposed adjacent the floral grouping 120 and absorbs water from the floral grouping 120.

In addition, the second sheet of material 26 may be disposed on the outer surface of the wrapper 130, rather than the inner surface of the wrapper 130 adjacent the floral grouping 120, if desired in a particular application.

The term "bonding material" when used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer which may be applied to the sheet of material and, in this instance, heat, sound waves, or vibrations, also must be applied to effect the sealing.

The term "bonding material" when used herein also means any type of material or thing which can be used to effect the bonding or connecting of the two adjacent portions of the material or sheet of material to effect the connection or bonding described herein. The term "bonding material" also includes ties, labels, bands, ribbons, strings, tape, staples or combinations thereof. Some of the bonding materials would secure the ends of the material while other bonding material may bind the circumference of the wrapper. Another way to secure the wrapping is to heat seal the ends of the material to another portion of the material. One way to do this is to contact the ends with an iron of sufficient heat to heat seal the material.

The term "bonding material" when used herein also means any heat or chemically shrinkable material, and static electrical or other electrical means, magnetic means, mechanical or barb-type fastening means or clamps, curl-type characteristics of the film or materials incorporated in the sheet of material which can cause the material to take on certain shapes, and any type of welding method which may weld portions of the sheet to itself or to the pot, or to both the sheet itself and the pot.

"Cling Wrap or Material" when used herein means any material which is capable of connecting to the sheet of material and/or itself upon contacting engagement during the wrapping process and is wrappable about an item whereby portions of the cling material contactingly engage and connect to other portions of the wrapping material for generally securing the sheet of material wrapped about at least a portion of the item. This connecting engagement is preferably temporary in that the wrapping material may be easily removed without tearing same, i.e., the cling material "clings" to the wrapping material. A wrapping material which remains securely connected to and about the wrapped item until the wrapping material is torn therefrom.

The cling material is constructed and treated if necessary, from polyethylene such as Cling Wrap made by Glad®, First Brands Corporation, Danbury, Conn. The thickness of the cling material will, in part, depend upon the thickness of the sheet of material utilized, i.e., generally, the thicker and therefore heavier sheet of material may require a thicker and therefore stronger cling material. The cling material will range in thickness from less than about 0.2 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as described herein. It will be appreciated that the cinching tab 18, the sheet of material 10, or any portion of either, may comprise cling material.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "band" when used herein means any material which may be secured about an object such as a flower pot, such bands commonly being referred to as elastic bands, rubber bands or non-elastic bands and also includes any other type of material such as an elastic or non-elastic string or elastic piece of material, non-elastic piece of material, a round piece of material, a flat piece of material, a ribbon, a piece of paper strip, a piece of plastic strip, a piece of wire, a tie wrap or a twist tie or combinations thereof or any other device capable of gathering the sheet of material to removably or substantially permanently form a crimped portion and secure the crimped portion formed in the sheet of material which may be secured about an object such as the flower pot. The band also may include a bow if desired in a particular application. Such a band may be included as a part of the cinching tab 18 or may comprise the cinching tab 18, however, the cinching tab 18 may not comprise a band, and the cinching tab 18 may be used without a band attached thereto as well.

The sheet of material used herein may further comprise at least one scent (not shown). Examples of scents utilized herein include (but are not limited to) floral scents (flower blossoms, or any portion of a plant), food scents (chocolate, sugar, fruits), herb or spice scents (cinnamon), and the like. Additional examples of scents include flowers (such as roses, daisies, lilacs), plants (such as fruits, vegetables, grasses, trees), foods (for example, candies, cookies, cake), food condiments (such as honey, sugar, salt), herbs, spices, woods, roots, and the like, or any combination of the foregoing. Such scents are known in the art, and are commercially available.

The scent may be disposed upon the sheet of material 10 by spraying the scent thereupon, painting the scent thereupon, brushing the scent thereupon, lacquering the scent thereupon, immersing the sheet of material in a scent-containing liquid, exposing the sheet of material to scent-containing gas, or any combination thereof.

The scent may be contained within a lacquer, or other liquid, before it is disposed upon the sheet of material 10. The scent may also be contained within a dye, ink, and/or pigment (not shown). Such dyes, inks and pigments are known in the art, and are commercially available, and may be disposed upon or incorporated in the sheet of material 10 by any method described herein or known in the art.

Embodiments of FIGS. 19A–20B

Shown in FIG. 19A and designated by the reference numeral 10i is a sheet of material having a first end 12i and a second end 13i, a first side 14i and a second side 15i and having an upper surface 16i and a lower surface 17i. Sheet 10i is exactly the same as sheet 10 described above in FIG. 1 except that the crimp connector is not a cinching tab but is instead a strip of bonding material disposed upon one of the surfaces of the sheet 10i. Disposed upon the upper side 16i of the sheet 10i is a wrapper connector comprising a strip of bonding material designated by the numeral 24i which covers a portion of the upper surface of the sheet of material and may be similar to the bonding material 24 of sheet 10. Additionally, as indicated in FIG. 19A a crimp connector comprising a second strip of bonding material 140i is disposed on the upper surface 16i of the sheet 10i. Shown in FIG. 20A and 20B is a sheet of material exactly the same as sheet 10i of FIG. 19A except that the crimp connector is a bonding material 140j disposed on a portion of the lower surface 17j of the sheet of material 10j.

Embodiments of FIGS. 21–26

Shown in FIG. 21 is a sheet of material 10i exactly the same as the sheet of material 10i shown in FIG. 19A. Disposed upon the upper surface 16i of the sheet of material 10i is a floral grouping 120 having a stem end 122 and a bloom end 124. One method of wrapping the sheet of material 10i about the floral grouping 120 is to draw the sheet 10i at side 15i in the direction 126 over the floral grouping 120 thereby causing the lower surface 17i of the sheet to become the externally oriented surface of the wrapper. The sheet of material 10i is wrapped about the floral grouping thus forming a wrapper 130i in exactly the same way as is disclosed above in FIGS. 13–18.

Shown in FIG. 23 is a wrapper 130i having a conical shape and possessing the additional strip of bonding material 140i. The bonding material 140i is disposed on the inner surface 16i of the wrapper 130i facing the stems 122 of the floral grouping 120.

In operation, the portion of the wrapper 130i in the vicinity of the strip of bonding material 140i is tightly grasped and crimped about the stems 122 of the floral grouping 120 thereby causing overlapping folds in the portion of the wrapper 130i adjacent the stems 122 to be bondingly connected thereby causing the portion of the wrapper 130i to be bound about the stems 122 thereby forming a connected portion 142i.

Shown in FIG. 25 is the same sheet of material 10i which has been wrapped in a cylindrical fashion about the floral grouping 120 thereby forming a cylindrically shaped wrapper 136i about the floral grouping substantially as shown above in FIG. 17. Bonding material 140i is disposed on the inner surface 16i of the wrapper 136i and surrounds a portion of the stem portion 122 of the floral grouping 120. The wrapper 136i is grasped and crimped in the vicinity of the bonding material 140i thereby causing the wrapper to overlap each other and be bonded together about the stems 122 of the floral grouping 120 thereby binding the wrapper 136i about the stems 122 thereby forming a connected area 142i about the stems 122.

Embodiments of FIGS. 27–32

Shown in FIG. 27 is the sheet of material 10j as shown in FIG. 20A here shown with the crimp connector, i.e., the bonding material 140j, disposed upon the surface 17j of the sheet 10j. The sheet of material 10j can be wrapped about the floral grouping 120 exactly the same as shown in FIGS. 21–26 to form a conically shaped wrapper 130j as shown in FIG. 29 or a cylindrically shaped wrapper 136j shown in FIG. 31.

As shown in FIG. 30, the wrapper 130j is grasped in proximity to the bonding material 140j and is crimped about the stems 122 of the floral grouping 120 thereby causing portions of the wrapper 130j to overlap and engage with one another forming a connected crimped portion 142j of the wrapper 130j about the floral grouping 120. Similarly to that shown in FIG. 32, the wrapper 136j and the bonding material 140j is crimped about the stems 122 thereby forming a connected area 142j of the wrapper 136j about the stems 122 of the floral grouping 120 disposed within the wrapper 136j.

Embodiments of FIGS. 33–37

Shown in FIG. 33 is a wrapper generally designated by the numeral 148. The wrapper 148 is of a type of wrappers referred to in the floral industry as "sleeves". The wrapper 148 in one version as embodied herein is comprised of a first surface or sheet of material 150 having a first upper end 152, a first lower end 154, a first left-hand side 156, a first right-hand side 158, a first inner surface 160 and a first outer surface 162. The wrapper 148 further comprises a second surface or sheet 164 which has a second upper end 166, a second lower end 168, a second left-hand side 170, a second right-hand side 172, a second inner surface 174 and a second outer surface 176. The second sheet 164 is disposed upon the first sheet 150 whereby the first inner surface 160 is disposed adjacent the second inner surface 174. The first sheet 150 and the second sheet 164 may be of equal lengths. Alternatively, as shown in FIG. 33, one sheet may be longer than the other sheet, such as first sheet 150 being slightly longer than second sheet 164. The first left-hand side 156 of the first sheet 150 rests upon and adjacent the second left-hand side 170 of the second sheet 164. Similarly, the first right-hand side 158 of the first sheet 150 lies adjacent and upon the second right-hand side 172 of the second sheet 164. The first left-hand side 156 of sheet 150 is sealed to the second left-hand side 170 of the second sheet 164 forming a left-hand seal 178. The first right-hand side 158 of the first sheet 150 is sealed to the second right-hand side 172 of the second sheet 164 thereby forming a right-hand seal 180. The first sheet 150 and the second sheet 164 when sealed at seals 178 and 180 form a wrapper 148 having an open upper end 182 and an open lower end 184. The left-hand seal 178 and the right-hand seal 180 may be formed by any method to form a wrapper consistent with the use of present invention. Wrappers known as sleeves are well known by those of ordinary skill in the art and are commercially available and have been used for many years in the floral industry.

The wrapper 148 may similarly be composed of a single sheet of material (not shown) which has been folded over to form two surfaces and is sealed on abutting sides of each surface thereby forming a sleeve similar in appearance to the sleeve in FIG. 33 which has an open upper end and an open lower end. Similarly, a sleeve such as wrapper 148 may be formed and sealed at the lower end thereby forming a sleeve or wrapper which has only an open upper end. The left-hand seal 178 and the right-hand seal 180 may be formed by adhesive methods, by heat-sealing methods, by sonic-sealing methods or vibratory-sealing methods or any appropriate method for forming a seal between two sheets. The wrapper 148 further comprises a crimp connector 188 disposed on a portion of the wrapper 148. The connector 188 as shown in FIG. 33 is comprised of a bonding material and release strip disposed upon a portion of the second sheet of material 164 near the second right-hand side 172 of the second sheet 164. The crimp connector has a double-sided adhesive 190 as shown in FIG. 34. One side of the double-sided adhesive 190 is adhesively disposed against the second sheet 164 and the other side of the double-sided adhesive 190 is covered by a release strip or tape 192 which when removed exposes the adhesive 190.

In operation, as shown in FIG. 35 the wrapper 148 is opened to expose the interior space 193 between the inner surface 160 of the first sheet 150 and the inner surface 174 of the second sheet 164. A floral grouping 120 exactly the same as floral grouping 120 described above is disposed within the interior space 193 of the wrapper 148 such that the stems 122 are oriented near the lower end 184 of the wrapper 148 and the upper end 124 of the floral grouping 120 is disposed near the upper end 182 of the wrapper 148. The release tape 192 is removed from the crimp connector 188 prior to the crimping of the wrapper about a portion of the floral grouping.

As shown in FIG. 36, a first overlapping portion 194 of the wrapper 148 is drawn in direction 196 and a second overlapping portion 198 of the wrapper 148 is drawn in the direction 200 whereby the double-sided adhesive strip 190 is contacted to the first overlapping portion 194. The adhesive portion 190 is cinched tightly about the wrapper 148 and the portion of the wrapper 148 disposed thereabout is crimped tightly about the stems 122 of the floral grouping 120 thereby forming overlapping portions of the wrapper 148 about the stems 122 of the floral grouping 120 to form a connected area 202 thereby causing the wrapper 148 to be held crimpingly and firmly about the stems 122. The crimp connector 188 may be formed from a bonding material other than an adhesive, such as the bonding materials described herein.

Embodiments of FIGS. 38–41

Shown in FIG. 38 is a wrapper designated by the general reference numeral 148a. The wrapper 148a is exactly the same as the wrapper 148 shown in FIG. 33 except that the wrapper 148a rather than having an adhesive strip with a release strip has a crimp connector comprising a cinching tab 206a which is exactly the same as cinching tab 18 in FIG. 1 except that the cinching tab 206a is attached to either the first sheet or surface 150a or the second sheet or surface 164a of the wrapper 148a. The cinching tab 206a has a first end 208a, a second end 210a and a bonding material portion 212a. Shown in FIG. 39 the cinching tab 206a is an extension of the first sheet of material 150a. However, it will be understood by one of ordinary skill in the art, that the cinching tab 206a could also be comprised of an extension of the second sheet 164a. Alternatively, the cinching tab 206a may be a separate piece of material which is affixed to either the first sheet 150a or the second sheet 164a.

As shown in FIGS. 40 and 41 the cinching tab 206a is utilized in exactly the same manner as the cinching tab 18a is used in FIGS. 16 and 18 to cinch a sheet of material to form a conically shaped wrapper about a floral grouping. Once the cinching tab 206a is made to cinch the wrapper tightly about the stem portion 122, a connected area 214a is formed from overlapped portions of the wrapper which are engaged with each other about the stems 122 thereby tightly and crimpingly connecting the wrapper 148a in an orientation about the stem portion 122.

Embodiments of FIGS. 42–45

Shown in FIG. 42 is a wrapper designated by the general reference numeral 148b. The wrapper 148b is exactly the same as the wrapper 148 in FIG. 33 except that the wrapper 148b has an internally disposed crimp connector comprising a bonding material 216b rather than a bonding strip externally located. The internal bonding material 216b is comprised of a first inner layer 218b of bonding material and a second inner layer 220b of bonding material. The first inner layer 218b of bonding material is disposed upon a portion of the inner surface 160b of the first sheet of material 150b. The second inner layer 220b of bonding material is disposed upon a portion of the inner layer 174b of the second sheet of material 164b.

In operation, as shown in FIGS. 44 and 45 a floral grouping 120 is disposed within the interior space 193b of the wrapper 148b substantially as described above. The wrapper 148b is then grasped and crimped in the vicinity of the internal closure bonding material 216b forcing portions of the wrapper 148b into overlapping folds in the vicinity of the internal closure bonding material 216b thereby causing overlapped portions of the inner surfaces of the wrapper 148b to crimpingly bond to each other and forming a crimped area 222b in the wrapper 148b in the vicinity about the stems 122 of the floral grouping 120.

Embodiments of FIGS. 46–49

Shown in FIG. 46 is a wrapper 148c which is exactly the same as the wrapper shown in FIG. 39 and the wrapper shown in FIG. 42 except that the crimp connector of wrapper 148c comprises both a cinching tab 206c similar to the cinching tab 206a of FIG. 39 and an internally disposed bonding material 216c which is exactly the same as the internally disposed bonding material 216b shown in FIG. 42. In the version of the present invention shown in FIG. 46, both the cinching tab 206c and the internally disposed bonding material 216c participate in the effective crimping and bonding of the wrapper 148c about the stems 122 of the floral grouping 120 to form a crimped area 222c in the wrapper 148c which functions to hold the wrapper 148c firmly against the stems 122 of the floral grouping 120.

In a preferred version of the method of the present invention, the internal bonding material 216c and the portion of the wrapper 148c proximate thereto is crimped about the stem portion 122 of the floral grouping 120 thereby causing the wrapper 148c to be crimpingly held in an orientation about the floral grouping 120. Next, the cinching tab 206c is wrapped about the crimped portion of the wrapper 148c to further bind the wrapper 148c close to the stem portion 122 of the floral grouping 120.

Embodiments of FIGS. 50-53

Shown in FIG. 50 is a wrapper designated by the general reference numeral 148d. The wrapper 148d is exactly the same as the wrapper 148b shown in FIG. 42 except that the bonding material is an externally disposed bonding material 226d which is disposed about a portion of the outer surface of the sheet 150d and a portion of the outer surface of the sheet 164d. The external bonding material is comprised of a layer 228d disposed on a portion of the first sheet 150d and a second layer 230d disposed on a portion of the second sheet 164d.

In operation, as shown in FIGS. 52 and 53 the wrapper 148d can be tightly crimped about the stems 122 of the floral grouping 120 by firmly grasping and crimping the externally disposed bonding material 226d about the stems 122 thereby crimping a portion of the wrapper 148d into a crimped area 232d about the stems 122. The wrapper 148d, when crimped about the stems 122 as shown in FIG. 53, appears substantially similar to the crimped portion of the sheet of material 136j as shown in FIG. 32.

Embodiments of FIGS. 54-57

Shown in FIG. 54 is a wrapper designated by the general reference numeral 148e. The wrapper 148e is exactly the same as the wrapper 148c shown in FIG. 46 except that the bonding material used for crimpingly forming the wrapper about the floral grouping 120 is an externally disposed bonding material 226e exactly the same as shown in FIG. 50 rather than an internally disposed bonding material as shown in FIG. 46. The external bonding material operates in exactly the same way as the external bonding material 226d in FIGS. 51-53. Additionally however, the cinching tab 206e functions to cause the wrapper 148e to be held more tightly about the stems 122 of the floral grouping 120 to form a crimped area 234e of the wrapper 148e about the stems 122 as shown in FIG. 57. The method of first crimping the externally disposed bonding material 226e, then wrapping the crimped portion with the cinching tab 206e is substantially similar to the method described for the embodiment of FIGS. 46-49, and described in more detail above.

Embodiment of FIG. 58

Shown in FIG. 58 is a wrapper designated by the general reference numeral 148f. The wrapper 148f is exactly the same as the wrapper 148a shown in FIG. 38 and functions in exactly the same manner except that the wrapper 148f additionally has an upper closure flap 240f and a lower closure flap 242f. The upper closure flap 240f further has an upper closure bonding strip 244f and when the upper closure flap 240f is folded in a direction 246f against the upper surface of the wrapper 148f, the upper end of the wrapper 148f is thereby closed. The lower closure flap has a lower closure bonding strip 248f and when the lower closure bonding flap is folded in a direction 250f against the wrapper 148f the lower end of the wrapper 148f is thereby closed. In this manner, the wrapper can be completely closed about a floral grouping 120 disposed within the interior space thereof. It will also be understood by one of ordinary skill in the art that any of the sheets of material or sleeves or other wrappers described herein could be modified by the addition of an upper closure flap or a lower closure flap.

It will also be noted that any of the strips of bonding material described herein may be protected by a release strip which can be removed to expose the bonding material thereunder.

Embodiment of FIGS. 59-62

Shown in FIG. 59 is a sheet of material designated by the general reference numeral 10k and which is exactly the same as sheet 10 except for the differences noted herein. The sheet of material 10k has an upper surface 16k and a lower surface 17k and sheet connector comprising a strip of material 24k comprising a closure bonding material. The strip of closure bonding material 24k is disposed upon the surface 16k of the sheet 10k. The sheet 10k further comprises a label connector which is a second strip 254k of bonding material disposed on a portion of the surface 17k of the sheet of material 10k as shown in FIGS. 59-62. The label connector 254k serves to bond a card or label 256k shown by way of example in FIG. 62. The card or label 256k can be attached to the bonding material 254k for the purposes of providing information to the purchaser or user of the floral grouping disposed within the wrapper 130k or 136k. The card or label 256k may have printed thereon various floral indicia 258k. The floral indicia 258k may comprise a greeting such as "Happy Birthday" and may also provide a space indicating the identity of the sender. The floral indicia also typically includes a space for writing in the identity of the recipient of the floral grouping. Any other greeting such as "Merry Christmas" or "Happy Easter" or any other form of greeting may be included on the front surface of the card or label 256k. Also, the floral indicia 258k may be in the form of care instructions relating to the particular floral grouping. The care instructions could include instructions as to the sunlight required by the particular plant, the watering instructions for the particular plant or floral grouping, or any other instructions or information relating to the care of the particular plant associated with the card or label 256k. The floral indicia 258k could also comprise a UPC code.

As shown in FIGS. 61 and 62, the sheet of material 10k can be wrapped about the floral grouping 120 to form a conical wrapper 130k or a cylindrical wrapper 136k for the purpose of wrapping the floral grouping. The label connector 254k is exposed on the surface 17k once the sheet of material 10k has been wrapped about the floral grouping 120. As shown in FIGS. 59-62, the sheet 10k does not have a closure tab such as closure tab 18 of sheet 10. Alternately, a label connector 254k could be disposed upon the inner surface 16k of the sheet for affixing a label 256k within the wrapper.

Embodiments of FIGS. 63-66

Shown in FIG. 63 and designated by the general reference numeral 10m is a sheet of material exactly the same as the sheet of material 10k except that the sheet of material 10m further comprises a tab 18m exactly as described previously for sheet 10 described in FIG. 1. Sheet 10m therefore comprises a closure tab 18m and a bonding strip 254m located on surface 17m for bonding to a card or label as described in FIGS. 61 and 62 and designated therein as card 256k containing floral indicia 258k. The sheet 10m is wrapped about the floral grouping 120 exactly the same as shown in FIGS. 13–18 with the exception that for the wrappers 130m and 136m shown in FIGS. 65 and 66, the bonding strip 254m is disposed on the outside of the wrapper 130m or 136m for the purpose of bonding a card or label such as was discussed above.

Embodiments of FIGS. 67–70

Shown in FIG. 67 and designated by the general reference numeral 148g is a wrapper exactly the same as wrapper 148b described in FIG. 42 except that the crimp connector, or bonding material, disposed on the inner surfaces 160g and 174g of the wrapper 148b and designated by the reference numeral 216g does not extend completely from one side of the wrapper to the other side as shown in FIG. 42 for wrapper 148b. The wrapper 148g comprises instead a bonding material 216g which is disposed on continuous portions of the inner surfaces 160g and 174g of the wrapper 148g except for a gap 260g which interrupts the strip of bonding material 216g from extending entirely across the inner surfaces 160g and 174g of the wrapper 148g. This embodiment is represented in FIGS. 67 and 68. A strip of bonding material 218g is disposed upon a portion of the inner surface 160g of the sheet 150g and a strip of bonding material 220g is disposed upon a portion of the inner surface 174g of the sheet 164g of the wrapper 148g.

In operation, the stem portion of a floral grouping can be extended through the gap 260g of the wrapper 148g for enclosing the floral grouping 120.

Shown in FIG. 69 and designated by the general reference numeral 148h is a wrapper exactly the same as wrapper 148c shown in FIG. 46 except that the wrapper 148h has a crimp connector comprising a bonding material 216h disposed upon the inner surfaces 160h and 174h of the wrapper 148h exactly the same as the strip of bonding material 216g is disposed upon the inner surfaces 160g and 174g of the wrapper 148g as shown in FIG. 67. That is, the strip of material 216h does not extend entirely across the inner surfaces of the wrapper 148h from one side to the other but is interrupted by a gap 260h in the bonding material. The stems 122 of a floral grouping 120 can be extended through the gap 260h for increasing the ease of inserting the floral grouping 120 into the wrapper 148h. The wrappers 148g and 148h can then be wrapped about a floral grouping exactly as shown in FIGS. 44 and 45, and FIGS. 48 and 49, respectively.

Embodiments of FIGS. 71–74

Figure 71:
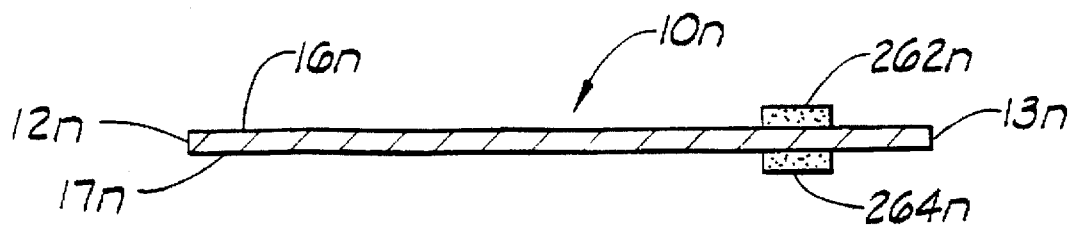
FIG. 71 is a side view of a sheet of material having a strip of bonding material on the upper surface and another strip of bonding material on the lower surface, the two strips generally opposite each other.

Shown in FIG. 71 and designated by the general reference numeral 10n is a side view of a sheet of material constructed exactly the same as the sheet of material 10i shown in FIG. 19A except that the sheet of material 10n comprises a crimp connector further comprising two strips of bonding material, one on each of the upper surface 16n and the lower surface 17n of the sheet of material 10n. The first strip of bonding material, on the upper surface 16n, is designated by the general reference numeral 262n and the second strip of bonding material, on the lower surface 17n of the sheet 10n is designated by the general reference numeral 264n. The composition of the bonding material 262n may be the same or different from the composition of the bonding material 264n.

Figure 72:
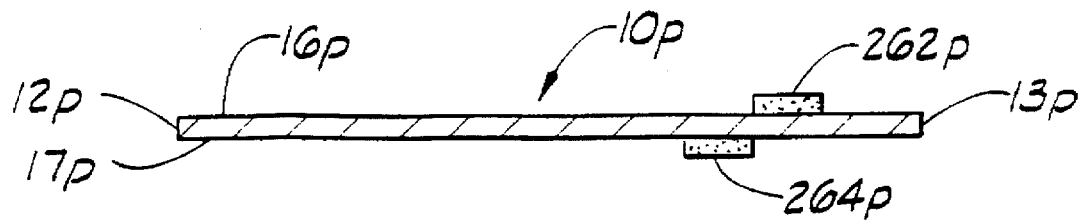
FIG. 72 is a side view of a sheet of material having a strip of bonding material on the upper surface and a strip of bonding material on the lower surface and wherein the two strips of material are oriented in a generally offset orientation to each other.

Shown in FIG. 72 and designated by the general reference numeral 10p is another sheet of material having a first strip of bonding material 262p on the upper surface 16p and a second strip of bonding material 264p shown on the lower surface 17p of the sheet of material 10p. The sheet of material 10p is exactly the same as sheet of material 10n except that the strips of bonding material 262p and 264p are offset from each other on opposite surfaces of the sheet as demonstrated in FIG. 72. The strips may be fully offset or partially offset from each other.

Figure 73:
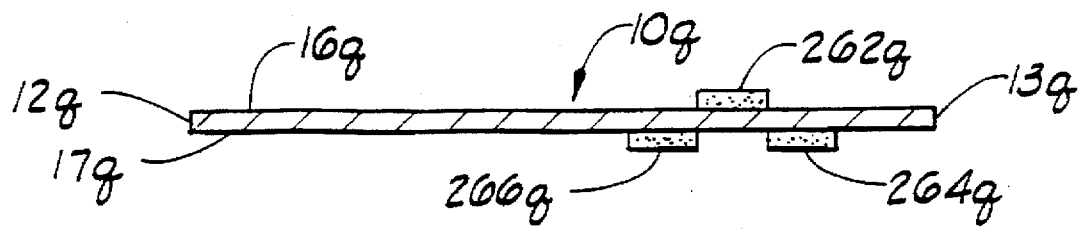
FIG. 73 is a side view of a sheet of material having a single strip of closure bonding material on one surface and two separate strips of closure bonding material on the lower surface thereof.

Shown in FIG. 73 and designated by the general reference numeral 10q is a sheet of material having an upper surface 16q and a lower surface 17q and having a first strip of bonding material 262q on the upper surface 16q and a pair of strips of bonding material 264q and 266q disposed on the lower surface 17q of the sheet 10q and in the same general vicinity as, but opposite to, the strip of material 262q. The strips 262q, 264q and 266q may be slightly offset or wholly offset or arranged in any number of orientations with regard to each other in accordance with the present invention as will be appreciated by one of ordinary skill in the art.

Figure 74:
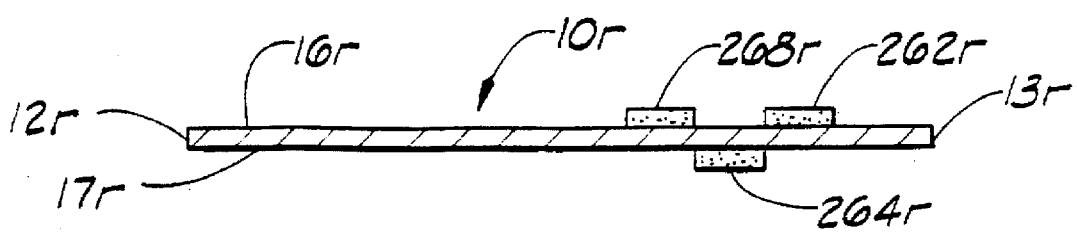
FIG. 74 is a side view of a sheet of material having two separate strips of bonding material on the upper surface and a single strip of bonding material separate therefrom on the lower surface of the sheet.

Shown in FIG. 74 is a sheet of material 10r having two strips of bonding material on the upper surface 16r and a single strip of bonding material on the lower surface 17r. The first strip of bonding material 262r is on the upper surface 16r generally near the end 13r of the sheet and the second strip of bonding material 264r is on the lower surface of 17r of the sheet of material 10r and the third strip of bonding material 268r is on the same surface of the sheet of material 10r as the strip of bonding material 262r. As noted above the composition of the strips of bonding material can be identical or different to each other and can be arranged in any one of a variety of orientations with regard to each other.

The sheets of material 10n–10r can be used in exactly the same way as the sheet of material 10i as shown in FIGS. 22–26 for forming a wrapper about a floral grouping wherein the bonding strips 262n–268r are crimped together to form crimped overlapping portions of the wrapper which engage each other about the stems of the floral grouping thereby holding the wrapper in close proximity to the floral grouping 120.

It will be understood by one of ordinary skill in the art that in the process of wrapping any of the wrappers or sheets of material disclosed herein about a floral grouping or plant that the purpose of the bonding material is to cause overlapping portions of the wrapper or sheet of material forming the wrapper to adhere to other adjacent overlapping portions of the wrapper or sheet thereby causing the wrapper or sheet of material to be held generally and firmly about the stems of the floral grouping. It will also be understood by one of ordinary skill in the art that the bonding material may partially bond or not bond at all to the stem portion of the floral grouping as the wrapper or sheet of material is crimped about the stems of the floral grouping to bind the wrapper about the floral grouping.

When a sheet of material such as one of the sheets 10n–10r are crimped about a floral grouping as described above, the overlapping portions of the inner surface of the sheet crimpingly engage other overlapping portions of the inner surface. Similarly, the overlapping portions of the outer surface of the sheet crimpingly engage other overlapping portions of the outer surface.

Also, envisioned within the context of the present invention are wrappers (sleeves) which have strips of crimping bonding material both on the inner surfaces of the first and second surfaces of the wrapper and on the outer surfaces of the first and second surfaces of the wrapper. Each of the sheets of material or wrappers having such dual bonding strips as described herein may also have a cinching tab as described above.

Changes may be made in the construction and the operation of the various components, elements and assemblies described herein or in the steps or the sequence of steps of the methods described herein without departing from the spirit and scope of the invention as defined in the following claims.

What is claimed is:

1. A method for wrapping a floral grouping comprising:
providing a floral grouping having an upper end and a stem portion;
providing a tubular sleeve comprising:
a first panel, the first panel having an inner surface, an outer surface, an upper end, a lower end, a left-hand side and a right-hand side,
a second panel, the second panel having an inner surface, an outer surface, an upper end, a lower end, a left-hand side and a right-hand side,
and wherein the first panel and the second panel are disposed flatwise upon each other, the inner surface of the first panel facing the inner surface of the second panel and further wherein the left-hand side of the first panel and the left-hand side of the second panel are sealed together and the right-hand side of the first panel and the right-hand side of the second panel are sealed together forming an interior space between the first panel and the second panel and into which a floral grouping is disposable, and
a crimp connecting adhesive means disposed upon a portion thereof;
placing the floral grouping into the interior space of the sleeve; and
positioning the sleeve about the floral grouping so that the crimp connecting adhesive means is adjacent the stem portion of the floral grouping and crimping the crimp connecting adhesive means to crimp the sleeve adjacent the stem portion for wrapping the sleeve about the stem portion of the floral grouping.

2. The method of claim 1 wherein the step of providing a tubular sleeve further comprises providing a plurality of tubular sleeves and selecting a single sleeve therefrom for placing about the floral grouping.

3. The method of claim 1 wherein in the step of providing a tubular sleeve the sleeve is constructed from a material selected from the group of materials consisting of paper (treated or untreated), cellophane, foil, polymer film, fabric (natural or synthetic, woven or unwoven), or burlap or combinations thereof.

4. The method of claim 1 wherein in the step of providing the tubular sleeve each first or second panel of the tubular sleeve has a thickness in a range from less than about 1 mil to about 30 mils.

5. The method of claim 1 wherein in the step of providing the tubular sleeve the crimp connecting adhesive means further comprises a bonding material selected from the group consisting of a pressure sensitive adhesive or cohesive, a heat sensitive adhesive or cohesive, a sonically sealable adhesive or cohesive, a vibratingly sealing adhesive or cohesive, or a chemically sealing adhesive or cohesive.

6. The method of claim 1 wherein in the step of providing the tubular sleeve the crimp connecting adhesive means further comprises a cinching tab attached to the tubular sleeve and having a bonding material disposed upon a portion of the cinching tab.

7. The method of claim 1 wherein in the step of providing the tubular sleeve the crimp connecting adhesive means comprises a bonding material disposed upon a portion of at least one panel of the tubular sleeve.

8. The method of claim 7 wherein in the step of providing the tubular sleeve the crimp connecting adhesive means further comprises the bonding material disposed upon a portion of the outer surface of at least one of the first or second panels of the tubular sleeve.

9. The method of claim 7 wherein in the step of providing the tubular sleeve the crimp connecting adhesive means further comprises the bonding material disposed upon a portion of the inner surface of at least one of the first or second panels of the tubular sleeve.

10. The method of claim 7 wherein in the step of providing the tubular sleeve the crimp connecting adhesive means further comprises the bonding material disposed upon portions of both the inner surfaces and the outer surfaces of the first and second panels of the tubular sleeve.

11. The method of claim 7 wherein in the step of providing a tubular sleeve, the crimp connecting adhesive means further comprises a cinching tab for wrapping about the crimped portion of the tubular sleeve.

12. The method of claim 7 wherein in the step of providing the tubular sleeve the bonding material of the crimp connecting adhesive means has a release strip disposed thereupon.

13. The method of claim 1 wherein in the step of providing a tubular sleeve, the sleeve further comprises closure means extending from the tubular sleeve for enclosing the upper end, the lower end or both the upper end and lower end of the tubular sleeve.

14. A method for wrapping a floral grouping and affixing a label thereto, comprising:
providing a floral grouping having an upper end and a stem portion;
providing a tubular sleeve having:
a first panel, the first panel having an inner surface, an outer surface, an upper end, a lower end, a left-hand side and a right-hand side,
a second panel, the second panel having an inner surface, an outer surface, an upper end, a lower end, a left-hand side and a right-hand side,
and wherein the first panel and the second panel are disposed flatwise upon each other, the inner surface of the first panel facing the inner surface of the second panel and further wherein the left-hand side of the first panel and the left-hand side of the second panel are sealed together and the right-hand side of the first panel and the right-hand side of the second panel are sealed together forming an interior space between the first panel and the second panel and into which a floral grouping is disposable,
a crimp connecting adhesive means disposed upon a portion thereof, and
a label bonding material comprising a bonding material disposed upon a portion of a panel of the sleeve for affixing a label to a portion of the sleeve;
providing a label for affixing to the label bonding material;
placing the floral grouping into the interior space of the sleeve;
positioning the sleeve about the floral grouping so that the crimp connecting adhesive means is adjacent the stem portion of the floral grouping and crimping the crimp connecting adhesive means to crimp the sleeve adjacent the stem portion for wrapping the sleeve about the stem portion of the floral grouping; and
affixing the label to the sleeve.

15. A method for wrapping a floral grouping comprising:
providing a floral grouping having an upper end and a stem portion;

providing a tubular sleeve having an upper end, a lower end, an interior space, an opening at the upper end in communication with the interior space, wherein the interior space is sized to contain at least a substantial portion of the floral grouping, and the tubular sleeve having a crimp connecting adhesive means disposed upon a portion thereof;

placing the floral grouping into the interior space of the sleeve; and positioning the sleeve about the floral grouping so that the crimp connecting adhesive means is adjacent the stem portion of the floral grouping and crimping the crimp connecting adhesive means to crimp the sleeve adjacent the stem portion for wrapping the sleeve about the stem portion of the floral grouping.

16. The method of claim 15 wherein the step of providing a tubular sleeve further comprises providing a plurality of tubular sleeves and selecting a single sleeve therefrom for placing about the floral grouping.

17. The method of claim 15 wherein in the step of providing a tubular sleeve the sleeve is constructed from a material selected from the group of materials consisting of paper (treated or untreated), cellophane, foil, polymer film, fabric (natural or synthetic, woven or unwoven), or burlap or combinations thereof.

18. The method of claim 15 wherein in the step of providing the tubular sleeve each sleeve is constructed of a first panel and a second panel and each first or second panel of the tubular sleeve has a thickness in a range from less than about 1 mil to about 30 mils.

19. The method of claim 15 wherein in the step of providing the tubular sleeve the crimp connecting adhesive means further comprises a bonding material selected from the group consisting of a pressure sensitive adhesive or cohesive, a heat sensitive adhesive or cohesive, a sonically sealable adhesive or cohesive, a vibratingly sealing adhesive or cohesive, or a chemically sealing adhesive or cohesive.

20. The method of claim 15 wherein in the step of providing the tubular sleeve the crimp connecting adhesive means further comprises a cinching tab attached to the tubular sleeve and having a bonding material disposed upon a portion of the cinching tab.

21. The method of claim 15 wherein in the step of providing a tubular sleeve, the sleeve further comprises closure means extending from the tubular sleeve for enclosing the upper end, the lower end or both the upper end and lower end of the tubular sleeve.

22. The method of claim 15 wherein in the step of providing a tubular sleeve, the lower end of the tubular sleeve is closed.

23. The method of claim 15 wherein in the step of providing a tubular sleeve, the sleeve has a label bonding material disposed upon a portion thereof for affixing a label to a portion of the sleeve.

24. The method of claim 15 wherein in the step of providing the tubular sleeve the sleeve is constructed from a first panel and a second panel and the crimp connecting adhesive means comprises a bonding material disposed upon a portion of at least one panel of the tubular sleeve.

25. The method of claim 24 wherein in the step of providing the tubular sleeve the crimp connecting adhesive means further comprises the bonding material disposed upon a portion of an outer surface of at least one of the first or second panels of the tubular sleeve.

26. The method of claim 24 wherein in the step of providing the tubular sleeve the crimp connecting adhesive means further comprises the bonding material disposed upon a portion of an inner surface of at least one of the first or second panels of the tubular sleeve.

27. The method of claim 24 wherein in the step of providing the tubular sleeve the crimp connecting adhesive means further comprises the bonding material disposed upon portions of both an inner surface and an outer surface of the first and second panels of the tubular sleeve.

28. The method of claim 24 wherein in the step of providing a tubular sleeve, the crimp connecting adhesive means further comprises a cinching tab for wrapping about the crimped portion of the tubular sleeve.

29. The method of claim 24 wherein in the step of providing a tubular sleeve the bonding material of the crimp connecting adhesive means has a release strip disposed thereupon.

30. A method for wrapping a floral grouping, comprising:

providing a floral grouping having an upper end and a stem portion;

providing a floral sleeve having an upper end, a lower end, an interior space, an outer surface and an opening at the upper end in communication with the interior space, wherein the interior space is sized to contain at least a portion of the floral grouping, and the floral sleeve having a crimp connecting adhesive means disposed upon a portion of the outer surface of the sleeve;

placing the floral grouping into the interior space of the sleeve;

positioning the sleeve about the floral grouping so the crimp connecting adhesive means is adjacent the stem portion of the floral grouping; and crimping the crimp connecting adhesive means to crimp the sleeve adjacent the stem portion for wrapping the sleeve about the stem portion of the floral grouping.

31. The method of claim 30 wherein in the step of providing the floral sleeve, the crimp connecting adhesive means is disposed upon a portion of the outer surface near the lower end of the sleeve for crimping the sleeve near the lower end of the sleeve.

32. The method of claim 30 wherein in the step of providing the floral sleeve, the crimp connecting adhesive means further comprises a release strip thereon and further comprising the step of removing the release strip prior to crimping the sleeve about the floral grouping.

33. The method of claim 30 wherein the step of providing a sleeve further comprises providing a plurality of sleeves and selecting a single sleeve therefrom for placing about the floral grouping.

* * * * *